(12) United States Patent
Lennen

(10) Patent No.: US 10,768,311 B2
(45) Date of Patent: Sep. 8, 2020

(54) SYSTEM AND METHOD FOR COMBINING SIGNALS FOR IMPROVED PERFORMANCE IN CHALLENGING ENVIRONMENT

(71) Applicant: Samsung Electronics Co., Ltd., Gyeonggi-do (KR)

(72) Inventor: Gary Lennen, Cupertino, CA (US)

(73) Assignee: Samsung Electronics Co., Ltd (KR)

( * ) Notice: Subject to any disclaimer, the term of this patent is extended or adjusted under 35 U.S.C. 154(b) by 254 days.

(21) Appl. No.: 15/928,764

(22) Filed: Mar. 22, 2018

(65) Prior Publication Data

US 2019/0196023 A1    Jun. 27, 2019

Related U.S. Application Data

(60) Provisional application No. 62/610,683, filed on Dec. 27, 2017.

(51) Int. Cl.
  *G01S 19/20* (2010.01)
  *G01S 19/42* (2010.01)
  (Continued)

(52) U.S. Cl.
  CPC ............ *G01S 19/426* (2013.01); *G01S 19/20* (2013.01); *G01S 19/22* (2013.01); *G01S 19/30* (2013.01); *G01S 19/32* (2013.01)

(58) Field of Classification Search
  CPC ........ G01S 19/42; G01S 19/426; G01S 19/20; G01S 19/22; G01S 19/24; G01S 19/30;
  (Continued)

(56) References Cited

U.S. PATENT DOCUMENTS 6,160,841 A    12/2000   Stansell et al.
6,249,245 B1    6/2001   Watters et al.
(Continued)

FOREIGN PATENT DOCUMENTS

| CN | 108957492 A | * 12/2018 |
|---|---|---|
| EP | 2 818 893 | 12/2014 |
| WO | WO 2007/016595 | 2/2007 |

OTHER PUBLICATIONS

Macchi-Gernot, Florence et al., Combined Acquisition and Tracking Methods for GPS L1 C/A and L1C Signals, International Journal of Navigation and Observation, vol. 2010, Article ID 190465, 19 pages.

(Continued)

*Primary Examiner* — Harry K Liu
(74) *Attorney, Agent, or Firm* — The Farrell Law Firm, P.C.

(57) ABSTRACT

Apparatuses and methods of manufacturing same, systems, and methods are described for combining received and correlated Global Navigation Satellite System (GNSS) signals and using the combined signal for improving GNSS reception in, inter alia, challenging environments. In one aspect, a first correlated GNSS signal and a second correlated GNSS signal are stored and then combined, and the combined signal is used to adjust reception of the first GNSS signal and/or the second GNSS signal. If the first and second correlated GNSS signals are stored by unequal time periods, time periods of one or both are added together until the total added first correlated GNSS signal is the same length of time as the total added second correlated GNSS signal. In order to properly combine the GNSS signals, gain/balancing factor(s) may be applied, the polarity of one or both may be flipped, etc.

20 Claims, 7 Drawing Sheets

(51) Int. Cl.
- G01S 19/32 (2010.01)
- G01S 19/30 (2010.01)
- G01S 19/22 (2010.01)

(58) Field of Classification Search
CPC .......... G01S 19/32; G01S 19/28; G01S 19/09; G01S 5/0027
USPC .................................................. 342/357.25
See application file for complete search history.

(56) References Cited

U.S. PATENT DOCUMENTS

| | | | | |
|---|---|---|---|---|
| 6,437,736 | B2* | 8/2002 | Ueda | G01S 19/05 342/357.62 |
| 7,020,220 | B2 | 3/2006 | Hansen | |
| 8,305,268 | B2 | 11/2012 | Lennen | |
| 8,736,489 | B2* | 5/2014 | Goto | G01S 19/32 342/357.72 |
| 8,953,663 | B2 | 2/2015 | Kravitz | |
| 8,989,236 | B2 | 3/2015 | Goldberg et al. | |
| 9,291,717 | B2 | 3/2016 | Lennen | |
| 9,482,760 | B2 | 11/2016 | Lennen | |
| 9,784,845 | B2 | 10/2017 | Lennen | |
| 2010/0085250 | A1* | 4/2010 | Ahmed | G01S 19/30 342/357.43 |
| 2011/0237277 | A1 | 9/2011 | Terashima et al. | |
| 2012/0169538 | A1* | 7/2012 | Singh | G01S 19/30 342/357.69 |
| 2012/0257651 | A1* | 10/2012 | Rao | H04L 25/03203 375/147 |
| 2015/0326303 | A1* | 11/2015 | Prunean | H04B 7/18523 370/335 |
| 2016/0259060 | A1* | 9/2016 | Kurby | G01S 19/05 |
| 2018/0180741 | A1* | 6/2018 | Capet | H01Q 1/3233 |
| 2019/0011569 | A1* | 1/2019 | Faragher | G01S 19/05 |

OTHER PUBLICATIONS

Chen, Yu Hsuan et al., Combining L1 Signals for Improved Sensitivity, Proceedings of the 2015 International Technical Meeting of The Institute of Navigation, Dana Point, California, Jan. 2015, pp. 164-172.
Avila-Rodriguez, Jose Angel, The MBOC Modulation, A Final Touch for the Galileo Frequency and Signal Plan, Inside GNSS, Sep./ Oct. 2007, pp. 43-58.
Pirsiavash, All et al., Characterization of Signal Quality Monitoring Techniques for Multipath Detection in GNSS Applications, Sensors Journal, vol. 17, Issue 7, 24 pages.
Li, Hanqi et al., An Unambiguous Receiving Technique for BOC(n,n) Signal, 2014 IEEE International Conf. on Signal Processing, Communications and Computing, pp. 379-383.
Betz, John W. et al. Enhancing the Future of Civil GPS, Overview of the L1C Signal, Inside GNSS, Spring 2007, pp. 42-49.
Lohan, Elena Simone et al., Binary-Offset-Carrier modulation techniques with applications in satellite navigation systems, Wireless Communications and Mobile Computing, 2007, pp. 767-779.
Gao, Grace Xingxin et al., How Many GNSS Satellites are Too Many?, IEEE Transactions on Aerospace and Electronic Systems vol. 48, No. 4 , Oct. 2012, pp. 2865-2874.
Wikipedia definition, binary offset carrier modulation.
Petovello, Mark, GNSS Solutions: Multipath vs. NLOS signals, How Does Non-Line-of-Sight Reception Differ from Multipath Interference, Inside GNSS, Nov./Dec. 2013, pp. 40-44.
Bhuiyan, Mohammad Zahidul H. et al., Analysis of Multipath Mitigation Techniques with Land Mobile Satellite Channel Model, Radioengineering, vol. 21, No. 4, Dec. 2012, pp. 1067-1077.
Bhuiyan, Mohammad Zahidul H. et al., Code Tracking Algorithms for Mitigating Multipath Effects in Fading Channels for Satellite-Based Positioning, EURASIP Journal on Advances in Signal Processing, vol. 2008, Article ID 863629, 17 pages.
Andrianarison, Maherizo et al., Innovative Techniques for Collective Detection of Multiple GNSS Signals in Challenging Environments, 2016 International Conference on Indoor Positioning and Indoor Navigation (IPIN), Oct. 4-7, 2016, Alcalá de Henares, Spain, 8 pages.
Sharp, I et al., Peak and leading edge detection for time-of-arrival estimation in band-limited positioning systems, The Institution of Engineering and Technology 2009, vol. 3, Iss. 10, pp. 1616-1627.
Betz, John W. et al., Description of the L1C Signal, Proceedings of the 19th International Technical Meeting of the Satellite Division of The Institute of Navigation (ION GNSS 2006), Fort Worth, TX, Sep. 2006, pp. 2080-2091.
Amani, Elie et al., GPS Multipath Detection in the Frequency Domain, arXiv:1707.09770v1, Jul. 2017, 12 pages.
Rouabah, Khaled et al., GPS/Galileo Multipath Detection and Mitigation Using Closed-Form Solutions, Hindawi Publishing Corporation, Mathematical Problems in Engineering, vol. 2009, Article ID 106870, 20 pages.
Brocard, Phillippe et al., Performance Evaluation of Multipath Mitigation Techniques for Critical Urban Applications Based on a Land Mobile Satellite Channel Model, IEEE/ION Plans 2014, Position Location and Navigation Symposium, May 2014, pp. 612-625.
Bhuiyan, Mohammad Zahidul H. et al., Advanced Multipath Mitigation Techniques for Satellite-Based Positioning Applications, Hindawi Publishing Corporation, International Journal of Navigation and Observation, vol. 2010, Article ID 412393, 15 pages.
Lohan, Elena Simona et al., Accuracy Limits in Multi-GNSS, IEEE Transactions on Aerospace and Electronic Systems vol. 52, No. 5 Oct. 2016, pp. 2477-2494.
Bhuiyan, Mohammad Zahidul H., Analysis of Multipath Mitigation Techniques for Satellite-based Positioning Applications, Thesis for degree of Doctor of Science in Technology, Tampere University of Technology, Publication 981, Sep. 2011, 109 pages.
The Cabinet Office, Government of Japan ("CAO") and Quasi-Zenith Satellite Systems Services Inc., Quasi-Zenith Satellite System Interface Specification Satellite Positioning, Navigation and Timing Service, Mar. 28, 2017, 148 pages.
Bhuiyan, Mohammad Zahidul H. et al.,A Slope-Based Multipath Estimation Technique for Mitigating Short-Delay Multipath in GNSS Receivers, Proc. of IEEE International Symposium on Circuits and Systems, pp. 3573-3576, May 30-Jun. 2, 2010, Paris, France.
Hu, Yi et al., An Efficient Method for GPS Multipath Mitigation Using the Teager-Kaiser-Operator-Based Medll, Radioengineering, vol. 22, No. 4, Dec. 2013, pp. 1202-1210.
Jovanovic, Aleksandar et al., Multipath Mitigation Techniques for CBOC, TMBOC and AltBOC Signals using Advanced Correlators Architectures, Position Location and Navigation Symposium (PLANS), 2010 IEEE/ION, May 4-6, 2010, pp. 1127-1136.
Bhuiyan, Mohammad Zahidul H. et al., Peak Tracking algorithm for Galileo-based positioning in multipath fading channels, Proc. of IEEE International Conference on Communications, Jun. 24-28, 2007, Glasgow, Scotland, pp. 5927-5932.
Bhuiyan, Mohammad Zahidul H. et al., Multipath mitigation performance of multi-correlator based code tracking algorithms in closed and open loop model, Wireless Conference, 2009. EW 2009. European, May 17-20, 2009, pp. 84-89.
Hein, Guenter W. et al., MBOC: The New Optimized Spreading Modulation Recommended for Galileo L1 OS and GPS L1C, Position, Location, And Navigation Symposium, 2006 IEEE/ION, Coronado, CA, Apr. 25-27, 2006, pp. 883-892.
Gallardo, Moises Navarro et al., Code Smoothing for BOC Ambiguity Mitigation, 2013 International Conference on Localization and GNSS (ICL-GNSS), Turin, Italy, Jun. 25-27, 2013, 6 pages.
Zhang, Yanbin et al., A Fast Acquisition Algorithm based on FFT for BOC Modulated Signals, TENCON 2015—2015 IEEE Region 10 Conference, Macao, China, Nov. 1-4, 2015, 6 pages.
Liu, Zhe et al., Double Strobe Technique for Unambiguous Tracking of TMBOC Modulated Signal in GPS, IEEE Signal Processing Letters, vol. 22, No. 12, Dec. 2015, pp. 2204-2208.
Groves, Paul D. et al., Intelligent Urban Positioning, Shadow Matching and Non-Line-of-Sight Signal Detection, 2012 6th ESA

(56) References Cited

OTHER PUBLICATIONS

Workshop on Satellite Navigation Technologies and European Workshop on GNSS Signals and Signal Processing, (NAVITEC), Noordwijk, Netherlands, Dec. 2012, 8 pgs.

Esteves, Paulo et al., Collective Detection of Multi-GNSS Signals Vector-Acquisition Promises Sensitivity and Reliability Improvement, Inside GNSS, May/Jun. 2014, pp. 54-65.

Indian Space Research Organization, Indian Regional Navigation Satellite System, Signal in Space ICD for Standard Positioning Service, Version 1.1, Aug. 2017, 72 pages.

European GNSS (Galileo) open service, Signal in space Interface Control Document, European Union 2016, version 1.3, Dec. 2016, 88 pages.

Global positioning systems directorate systems engineering & integration—Interface specification IS-GPS-800D, Naystar GPS Space Segment/User Segment L1C Interface, Sep. 24, 2013, 127 pages.

Global Navigation Sattelite System, Glonass, Interface Control Document, Navigational radiosignal In bands L1, L2, (Edition 5.1) Moscow 2008, 65 pages.

BeiDou navigation satellite system—Signal in space interface control document, Open service signal B1I, China Satellite Navigation Office, version 1.0, Dec. 2012, 81 pages.

Bhuiyan, Mohammad Zahidul H. et al.,Multipath Mitigation Techniques for Satellite-Based Positioning Applications, Global Navigation Satellite Systems: Signal, Theory and Applications, Chapter 17, InTech, pp. 405-426.

Seals, Kelly C. et al., Using Both GPS LI C/ A and LIC: Strategies to Improve Acquisition Sensitivity, Proceedings of the 26th International Technical Meeting of the ION Satellite Division, Nashville, TN, Sep. 16-20, 2013, pp. 92-106.

Global positioning systems directorate systems engineering & integration—Interface Specification IS-GPS-200H, Navstar GPS Space Segment/Navigation User Interfaces, Sep. 24, 2013, 226 pages.

Chen, Yu Hsuan et al., Direct Comparison of the Multipath Performance of L1 BOC and C/A using On-Air Galileo and QZSSTransmissions, Position, Location and Navigation Symposium—Plans 2014, 2014 IEEE/ION, May 5-8, 2014, Monterey, CA, 10 pages.

Sun, Kewen et al., Channels Combining Techniques for a Novel Two Steps Acquisition of New Composite GNSS Signals in Presence of Bit Sign Transitions, Position, Location and Navigation Symposium—PLANS 2014, 2010 IEEE/ION, May 4-6, 2010, Indian Wells, CA, pp. 443-457.

Ward, Phillip W., Satellite signal acquisition, tracking, and data demodulation, chapter 5, Understanding GPS principles and applications (2nd Ed., 2005), pp. 153-241.

\* cited by examiner

SYSTEM AND METHOD FOR COMBINING SIGNALS FOR IMPROVED PERFORMANCE IN CHALLENGING ENVIRONMENT

PRIORITY

This application claims priority under 35 U.S.C. § 119(e) to U.S. Provisional Patent Application Ser. No. 62/610,683 filed on Dec. 27, 2017, the entire disclosure of which is incorporated herein by reference.

FIELD

The present disclosure relates generally to global navigation satellite systems (GNSS), and more particularly, to a system and method for combining signals for improved performance in a challenging environment.

BACKGROUND

Satellite navigational systems provide positional and timing information to earth-bound receivers. Each system has its own constellation of satellites orbiting the Earth, and, in order to calculate its position, a receiver on Earth uses the satellites "in view" (i.e., in the sky above) from that system's constellation. A global navigational satellite system (GNSS) is often used as the generic term for such a system, even though such navigational satellite systems include regional and augmented systems—i.e., systems that are not truly "global." The term "GNSS," as used herein, covers any type of navigational satellite system, global, regional, augmented or otherwise, unless expressly indicated otherwise.

SUMMARY

Accordingly, the present disclosure has been made to address at least the problems and/or disadvantages described herein and to provide at least the advantages described below.

According to one aspect of the present disclosure, a method is provided, including determining first correlations for a first type of satellite signal over a first period; determining second correlations for a second type of satellite signal over a second period; summing the second correlations from one or more second periods until the first period is substantially the same as the second period; modifying one or more of the first correlations and the summed second correlations in order to combine them; generating a combined satellite signal by combining the modified first correlations and the modified summed second correlations; and using the combined satellite signal to adjust reception of at least one of the first type of satellite signal and the second type of satellite signal.

According to another aspect of the present disclosure, an apparatus is provided, including one or more non-transitory computer-readable media; and at least one processor which, when executing instructions stored on the one or more non-transitory computer readable media, performs the steps of determining first correlations for a first type of satellite signal over a first period; determining second correlations for a second type of satellite signal over a second period; summing the second correlations from one or more second periods until the first period is substantially the same as the second period; modifying one or more of the first correlations and the summed second correlations in order to combine them; generating a combined satellite signal by combining the modified first correlations and the modified summed second correlations; and using the combined satellite signal to adjust reception of at least one of the first type of satellite signal and the second type of satellite signal.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
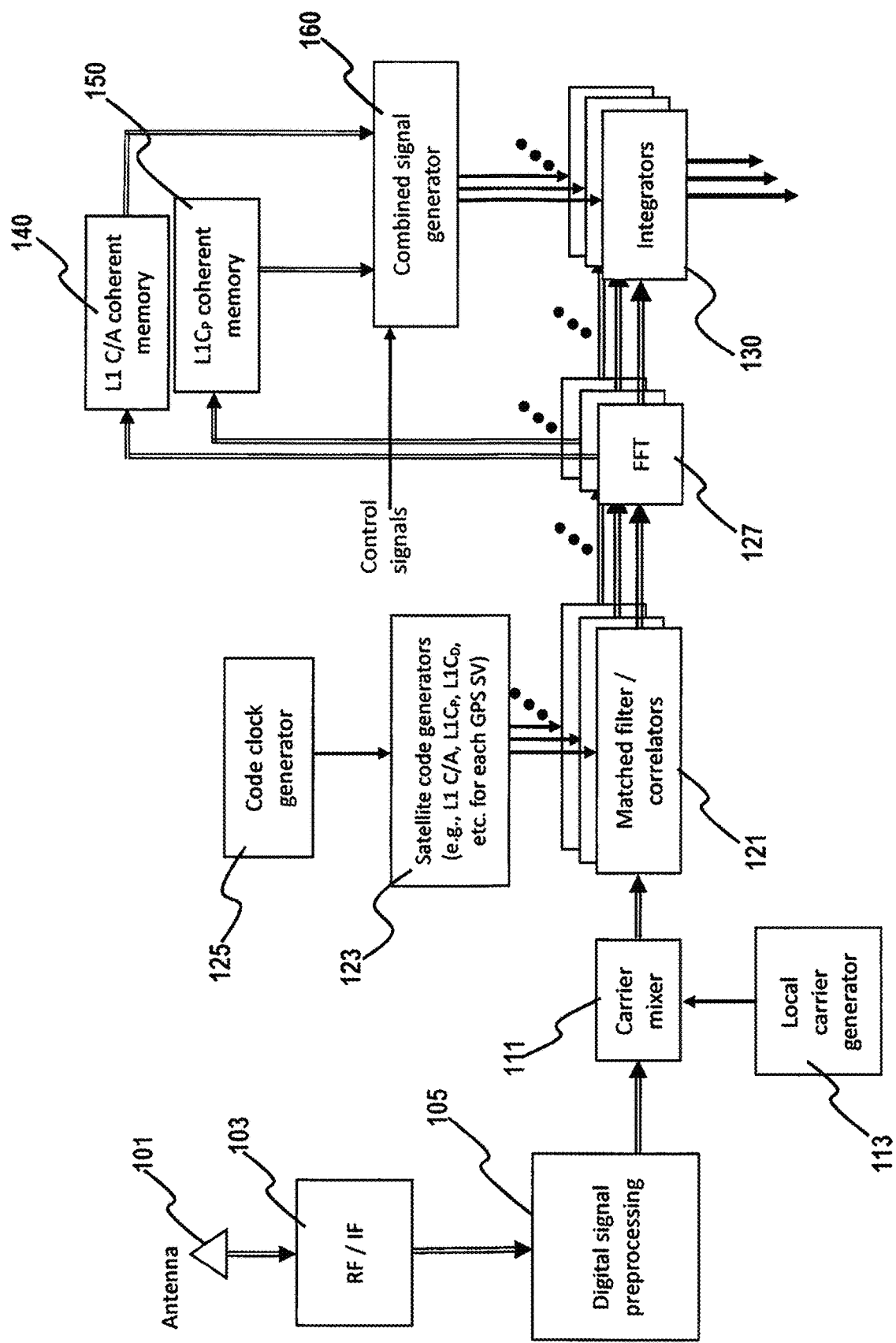
FIG. 1 illustrates an exemplary block diagram of the present GNSS receiver, according to an embodiment of the present disclosure.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope of the present disclosure. In addition, descriptions of well-known functions and constructions are omitted for clarity and conciseness.

Hereinafter, embodiments of the present disclosure are described in detail with reference to the accompanying drawings. It should be noted that the same elements are designated by the same reference numerals although they are shown in different drawings. In the following description, specific details such as detailed configurations and components are merely provided to assist in the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or custom. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although terms including an ordinal number such as first and second may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Various embodiments may include one or more elements. An element may include any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearance of the phrase "one embodiment" (or "an embodiment") in various places in this specification does not necessarily refer to the same embodiment.

The number of GNSS systems, both planned and presently operational, is growing. These include the widely-known, widely-used, and truly global global positioning system (GPS) of the United States, Russia's GLObalnaya NAvigatsionnaya Sputnikovaya Sistema (GLONASS), Europe's Galileo system, and China's BeiDou systems—each of which has, or will have, its own constellation of satellites orbiting the entire globe. See, e.g., descriptions of their "open," i.e., civilian/commercial signals: Global navigation satellite system—GLONASS—Interface control document—Navigational radio signal in bands L1, L2 (Edition 5.1) (2008) (hereinafter referred to generally as "GLONASS L1, L2 ICD"); European GNSS (Galileo) open service—Signal in space interface control document (version 1.3) (2016) (hereinafter referred to generally as "Galileo OS-SIS-ICD"); and BeiDou navigation satellite system—Signal in space interface control document—Open service signal B1I (version 1.0) (December 2012) (hereinafter referred to generally as "BeiDou ICD"), which are all incorporated herein by reference in their entirety; see also, e.g., Gao et al., How many GNSS satellites are too many? IEEE transactions in aerospace and electronic systems, vol. 48, no. 4 (October 2012) for overviews of the major GNSSs, their growth, signal modulations, etc., which is also incorporated herein by reference in its entirety.

Regional systems (those that are not global, but intended to cover only a certain region of the globe) include Japan's Quasi-zenith satellite system (QZSS) and the Indian regional navigational satellite system (IRNSS) are also currently being developed. See, e.g., Quasi-zenith satellite system—Interface specification—Satellite positioning, navigation and timing service (hereinafter referred to generally as "IS-QZSS-PNT-001") and Indian regional navigation satellite system—Signal in space ICD for standard positioning service (version 1.1) (hereinafter referred to generally as "ISRO-IRNSS-ICD-SPS-1.1"), both of which are incorporated herein by reference in their entirety.

Augmented systems, which are normally regional as well, and "augment" existing GNSS systems with, e.g., messages from ground-based stations and/or additional navigational aids, are also continually developing and expanding. These include the wide area augmentation system (WAAS), European geostationary navigation overlay service (EGNOS), multi-functional satellite augmentation system (MSAS), and GPS aided geo augmented navigation (GAGAN). Regional GNSS systems, such as QZSS, can also operate as augmented systems.

On the receiving side, GNSS capabilities are no longer limited to any particular type of system or device. A GNSS receiver may be implemented in a mobile terminal, a tablet computer, a camera, a portable music player, and a myriad of other portable and/or mobile personal consumer devices, as well as integrated into larger devices and/or systems, such as the electronics of a vehicle. Moreover, "assisted" GNSS (A-GNSS) technology is being developed for, e.g., measurement/testing of signals in cellular telecommunication systems. See $3^{rd}$ generation partnership project (3GPP) technical specification 3GPP TS 37.571: Universal terrestrial radio access (UTRA) and evolved UTRA (E-UTRA) and evolved packet core (EPC); user equipment (UE) conformance specification for UE positioning, which has five parts, all of which are incorporated herein by reference.

Moreover, multi-constellation GNSS receivers are being developed which receive signals from more than one satellite constellation (e.g., two or more of GPS, Galileo, GLONASS, BeiDou, regional systems, and/or augmentation system constellations) and provide much greater accuracy because the number of unblocked satellites, sometimes referred to as satellite/space vehicles (SVs), overhead at any time from several constellations is always greater than the number of SVs overhead from a single constellation. See, e.g., Esteves et al., Collective detection of multi-GNSS signals, Inside GNSS, pp. 54-65 (May/June 2014) (hereinafter, "Esteves 2014"); and Andrianarison et al., *Innovative techniques for collective detection of multiple GNSS signals in challenging environments,* 2016 Int'l conference on indoor positioning and indoor navigation (2016 IPIN), Oct. 4-7, 2016 (hereinafter, "Andrianarison 2016"); cf Lohan et al., *Accuracy limits in multi-GNSS,* IEEE transactions on aerospace and electronic systems, vol. 52, no. 5, pp. 2477-2494 (October 2016), all of which are incorporated by reference herein in their entirety.

The term "GNSS receiver" as used herein, covers any such implementation of GNSS capabilities in a device or system.

GNSS systems are being continually upgraded and developed, many based on new generations of satellites being launched. Each GNSS has several transmissions channels, some including military use channels which are separate from civilian use channels. Herein, "channels," "bands," and "codes" may sometimes be used interchangeably, as many GNSS signals are transmitted on the same channel (i.e., same frequency, same time) or band (i.e., frequency bandwidth), but with different codes, which effectively makes them different "channels," in the more general sense of the term.

GPS presently has five frequency bands, L1 through L5, but only the L1 band centered at 1575.42 MHz is presently being widely used by civilian consumer devices. In the L1 band, there are presently the civilian code/channel L1 C/A (for "coarse acquisition") and the military encrypted precision (P(Y)) code/channel. See, e.g., Global positioning systems directorate systems engineering & integration— Interface specification IS-GPS-200H (Sep. 24, 2013), describing the GPS L1 C/A, L2C, and P channels/codes (hereinafter referred to generally as "IS-GPS-200"), which is incorporated herein by reference.

However, another civilian code/channel in the L1 band, called L1C, has been developed over the past decade and are being presently implemented as the next generation of GPS satellites (called "Block IIIA satellites") are being prepared for launch. See, e.g., Betz et al., *Enhancing the future of civil GPS—overview of the L1C signal,* Inside GNSS, pp. 42-49 (Spring 2007); Betz et al., *Description of the L1C signal,* Proceedings of the 19th international technical meeting of the satellite division of the institute of navigation, Sep. 26-29, 2006 (ION GNSS 2006), pp. 2080-2091; and Global positioning systems directorate systems engineering & integration—Interface specification IS-GPS-800D (Sep. 24, 2013), describing the GPS L1C channel/code (hereinafter referred to generally as "IS-GPS-800"), which are all incorporated herein by reference.

Table 1A below shows the characteristics of the presently operational L1 C/A signal and the planned and presently becoming operational L1C signals.

TABLE 1A

GPS C/A AND L1C SIGNALS

| GNSS System | GPS | GPS |
|---|---|---|
| Service Name | C/A | L1C |
| Centre Frequency | 1575.42 MHz | 1575.42 MHz |
| Frequency Band | L1 | L1 |
| Access Technique | CDMA | CDMA |
| Signal Component | Data | Data Pilot |
| Modulation | BPSK(1) | TMBOC(6, 1, 1/11) |
| Sub-carrier frequency [MHz] | — | 1.023    1.023 & 6.138 |
| Code Frequency | 1.023 MHz | 1.023 MHz |
| Primary PRN Code length | 1023 | 10,230 |
| Code Family | Gold Codes | Weil Codes |
| Secondary PRN Code length | — | —    1800 |
| Data Rate | 50 bps/50 sps | 50 bps/50 sps    — |
| Minimum Received Power [dBW] | −158.5 | −157 |
| Elevation | 5° | 5° |

As can be seen in Table 1A, while the L1-C/A uses binary phase shift key (BPSK) modulation, L1C uses binary offset coding (BOC) modulation. The L1C signal has two components, a pilot signal $L1C_P$, without any data message, and a data signal $L1C_D$, including data such as SV ephemerides, system time, system time offsets, SV clock behavior, status messages, and other data messages. Both the pilot signal $L1C_P$ and the data signal $L1C_D$, are spread by a ranging code using a Weil code index, while $L1C_P$ is also modulated by an SV unique overlay code or secondary code, $L1C_O$, as indicated by the "secondary PRN code length" in Table 1A above. See IS-GPS-800.

The minimum received power for the L1C signal is indicated as −157 dBm above, but 75% of the power is in the pilot signal $L1C_P$. In Table 1B below, the relative receive powers of L1-C/A, $L1C_P$, and $L1C_D$ are shown. The pilot signal $L1$-$C_P$ nominally transmits 0.25 dB more power than L1 C/A, while the data signal $L1$-$C_D$ nominally transmits 4.5 dB less power than L1 C/A. The power of the combined signal may be determined as follows in Equation (1):

$$P_{comb} = 10 \log_{10} [10^{-163/10} + 10^{-158.25/10}] = -157 \text{ dBm} \quad (1)$$

TABLE 1B

RELATIVE RECEIVE POWER OF GPS
C/A, $L1C_P$, AND $L1C_D$ SIGNALS

| signal type | receive power (dBm) | Relative power | raw bits (msecs) |
|---|---|---|---|
| L1 C/A | −158.5 | 0.00 | 20 |
| L1-C pilot | −158.25 | +0.25 | 10 |
| L1-C data | −163.0 | −4.50 | 10 |

The L1C signal is also intended to be international, in the sense that other GNSSs have adopted, are adopting, and/or intend to adopt it (or a similar version of it), including Galileo, BeiDou, and GLONASS. See, e.g., Avila-Rodriguez et al., *The MBOC modulation—A final touch for the Galileo frequency and signal plan,* Inside GNSS, pp. 43-58 (September-October 2007) (describing GPS-Galileo agreement regarding using a common baseline modulation standard); Hein et al., *MBOC: the new optimized spreading modulation recommended for Galileo L1 OS and GPS L1C,* 2006 Position, location, and navigation symposium (2006 IEEE/ION), pp. 43-58 (Apr. 25-27, 2006); GALILEO OS SIS ICD (adopting E1 channel similar to L1C); Cameron, Alan, *New BeiDou TMBOC signal tracked; similar to future GPS L1C structure,* GPS World (Oct. 28, 2015); and definition of "Binary offset carrier modulation" on Wikipedia, last edited Dec. 14, 2017 (stating "the US GPS system, the Indian IRNSS system, and Galileo" are currently using BOC, i.e., in a L1C or L1C-like signal).

QZSS has already adopted an L1C signal. Table 2 below shows the characteristics of the C/A, L1C, and SAIF channels on QZSS.

TABLE 2

QZSS C/A, L1C, AND SAIF SIGNALS

| GNSS System | QZSS | QZSS | QZSS |
|---|---|---|---|
| Service Name | C/A | L1C | SAIF |
| Centre Frequency | 1575.42 MHz | 1575.42 MHz | 1575.42 MHz |
| Frequency Band | L1 | L1 | L1 |
| Access Technique | CDMA | CDMA | CDMA |
| Spreading Modulation | BPSK(1) | BOC(1, 1) | BPSK(1) |
| Sub-carrier frequency | — | 1.023 MHz | — |
| Code Frequency | 1.023 MHz | 1.023 MHz | 1.023 MHz |
| Signal Component | Data | Data   Pilot | Data |
| Primary PRN Code length | 1023 | 10,230 | 1023 |
| Code Family | Gold Codes | Weil Codes | Gold Codes |
| Secondary PRN Code length | — | 1800 | — |
| Bit Rate | 50 bps | 50 bps | 250 bps |
| Symbol Rate | 50 bps | 50 sps | 500 bps |
| Minimum Received Power [dBW] | −158.5 | −157 | −161 |
| Elevation | 5° | 5° | 5° |

The documents/standards defining the various GNSS signals, such as, for example, IS-GPS-800 (describing the GPS L1C channel/code), IS-GPS-200 (describing the GPS L1-C/A, L2C, and P channels/codes), GLONASS L1, L2 ICD, GALILEO OS-SIS-ICD, BEIDOU ICD, and IS-QZSS-PNT-001, and ISRO-IRNSS-ICD-SPS-1.1, which are all mentioned and incorporated above, may be collectively referred to herein as "interface control documents" or "ICDs."

Embodiments of the present disclosure provide systems, methods, and apparatuses for combining (or, in a sense, re-combining) GNSS signals to generate a multi-purpose combined signal. The signals discussed herein, such as the GPS L1 C/A signal, GPS L1C signal, and QZSS L1C signal, are already "combined," in the sense that they are transmitted at the same time and at the same center frequency, and thus are received at roughly the same and the same frequency by the GNSS receiver (ignoring, for the moment, multipath signals, non-line-of-sight (NLOS) signals, ionospheric effects, etc.). As explained in more detail below, the present disclosure involves re-combining signals after they have been separated by the receive chain of the GNSS receiver.

One embodiment of the present disclosure described herein combines GPS L1 C/A and L1C signals to generate a combined signal, which achieve a multitude of advantages and benefits, including the following:
- improved signal to noise ratio (SNR) by as much as, e.g., 3 dB.
- mitigation of the effects of multipath signals is mitigated with combining algorithm.
- efficient verification/tracking of the new three peaked BOC(1,1) signal which is a component of the L1C signal.

Embodiments of the present disclosure are suited for improving signal reception in challenging environments such as urban canyons, where there are typically multiple multipath and NLOS signals.

Although most of the description below is of an embodiment combining GPS L1C/A and GPS L1C signals, the present disclosure is not limited thereto, and multiple other possible embodiments are possible, some of which are mentioned herein, including, for example, combining the GPS L1C signal and the QZSS L1C signal. One of ordinary skill in the art would recognize the applicability of the present disclosure to a variety of signals from any truly global or regional GNSS.

In the GPS systems discussed below, data stripping of the GPS L1 C/A signal is assumed.

FIG. 1 illustrates an exemplary block diagram of the present GNSS receiver, according to an embodiment of the present disclosure. Only components of the receive chain of a GNSS receiver pertinent to embodiments of the present disclosure are shown/discussed herein. For more details regarding components in a GNSS receive chain, see, e.g., Ward et al., Satellite signal acquisition, tracking, and data demodulation, chapter 5, Understanding GPS principles and applications ($2^{nd}$ Ed., 2005), Kaplan and Hegarty, eds. (Artech House); U.S. Pat. Nos. 9,482,760, and 9,291,717, by the present inventor; all of which are incorporated by reference in their entirety.

In FIG. 1, the GNSS signals received by antenna 101 are processed by radiofrequency (RF)/intermediate frequency (IF) block 103 that amplifies, filters, and digitizes the received signals. The amplified, filtered, and digitized signals are fed to digital signal preprocessing block 105. The double lines connecting the boxes in FIG. 1 represent the fact that the signals being processed are complex, i.e., having both an in-phase (I) and quadrature (Q) components. Digital signal preprocessing block 105 detects and removes interfering signals. In a multi-GNSS embodiment, digital signal preprocessing block 105 separates the GNSS signals by their respective GNSS systems. For example, digital signal preprocessing block separates the GPS signals from the GLONASS signals.

The signals output from digital signal preprocessing block 105 are input into carrier mixer 111 that translates the input signals to baseband signals by mixing the input signals with signals output from local carrier frequency generator 113, which may be, for example, a numerically-controlled oscillator (NCO) with a look-up table (LUT). As would be understood by one of ordinary skill in the art, signal tracking methods (typically implemented in software) may form a carrier frequency tracking discriminator from the later correlations and apply a loop filter to provide feedback to local carrier frequency generator 113.

The baseband signals output from carrier mixer 111 are input into matched filter/correlators 121, which correlate the baseband signals with individual satellite codes which are fed from satellite code generator 123, thereby outputting sets of correlated signals for each satellite signal.

Satellite code generator 123 is driven by code clock generator 125. Similar to the carrier frequency tracking above, and as would be understood by one of ordinary skill in the art, code correlating/tracking algorithms (typically implemented in software) form a code tracking discriminator function that is further filtered to generate a feedback code phase shift estimate to code clock generator 125.

Each pair of correlated signals $I_{corr}$ and $Q_{corr}$ output from matched filter/correlators 121 are input into fast Fourier transform (FFT) modules 127, which translate the signals from the time domain to the frequency domain. The output of FFT modules 127 are input into integrators 130, which calculates $\sqrt{I^2+Q^2}$, thereby generating $M_{\tau,t}$, the absolute magnitude of the signal with chip delay $\tau$ and time t. $M_{\tau,t}$ may be input into a tracking and measurement engine which uses the input (and various feedback loops) to generate range measurement $R_t$ (based on the code phase) and range rate measurement $\Delta R_t$ (based on the carrier frequency/phase). A navigation engine may use measurements $R_t$ and $\Delta R_t$ generated by the tracking and measurement engine to compute the GNSS receiver's position, navigation, and/or time (PNT).

However, the output of FFT modules 127 are also output to L1 C/A coherent memory 140, which, inter alia, stores the calculated correlations of the I and Q components ($I_{C/A}$, $Q_{C/A}$) of the L1 C/A signal in 20 msec segments, and L1C coherent memory 150, which, inter alia, stores the calculated correlations of the I and Q components ($I_{Cp}$, $Q_{Cp}$) of the L1C pilot signal L1C$_P$ in 10 msec segments.

As explained in greater detail in reference to FIG. 2 below, these stored segments are combined together to form the combined signal L1C$_{COMB}$ ($I_{COMB}$, $Q_{COMB}$) in combined signal generator 160, which has many uses, as discussed further below, including, for example, more clearly defining the received signals by providing a much improved estimate of their peaks, as well as the cut-off point for ignoring signals which are most likely to be multipath signals.

Control signals for combined signal generator 160 are shown in FIG. 1 to represent that certain input may be required when generating the combined signal, such as a weighting or balancing factor to normalize the peak amplitudes of the two signals being combined and/or a built-in system gain factor between the two signals being combined.

Although FIG. 1 shows a combined signal generator 160 as generating the combined signal L1C$_{COMB}$ ($I_{COMB}$, $Q_{COMB}$), this is only to depict the function of generating the combined signal L1C$_{COMB}$ ($I_{COMB}$, $Q_{COMB}$), which may be accomplished by any combination of hardware and software and may be performed by one or more components in any configuration or distribution within the apparatus having the GNSS receive chain as shown in FIG. 1.

Figure 2:
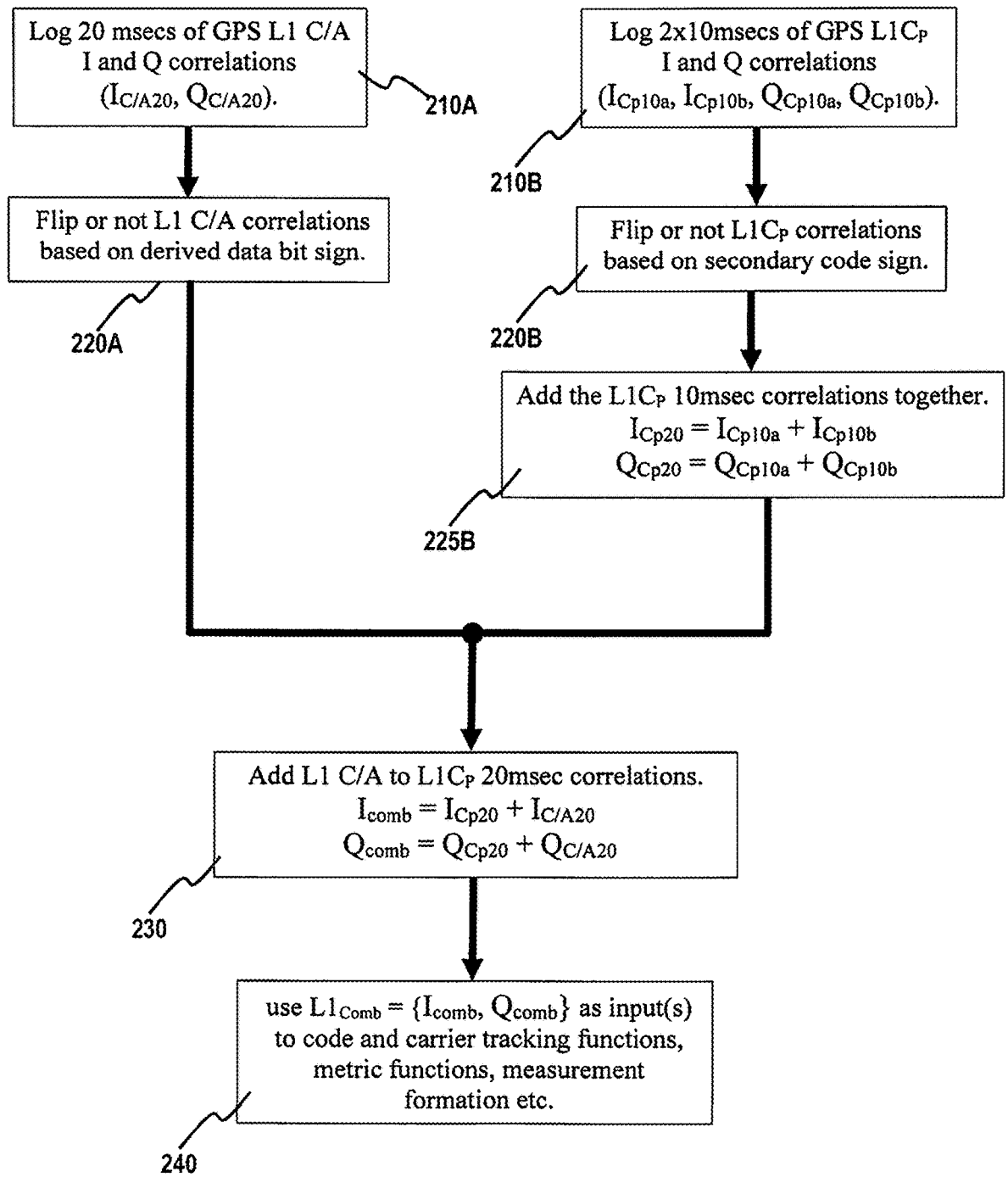
FIG. 2 illustrates an exemplary flowchart of the present exemplary method for combining signals, according to one embodiment of the present disclosure.

FIG. 2 illustrates an exemplary flowchart of the present exemplary method for combining signals, according to an embodiment of the present disclosure. Only details of the reception of the GPS L1 C/A signal and the GPS L1C$_P$ signal that are pertinent to generating the combined signal L1C$_{COMB}$ having components $I_{COMB}$ and $Q_{COMB}$ are shown/discussed in detail herein.

For more details regarding GPS L1 C/A signal reception, GPS L1C$_P$ signal reception, combined GNSS signal reception, and BOC/TMBOC modulated signal reception, see, e.g., IS-GPS-200; IS-GPS-800; U.S. Pat. Nos. 8,305,268 and 9,784,845, by the present inventor; Lohan et al., *Binary-Carrier-Offset modulation techniques with applications in satellite navigation systems,* Wireless communications and mobile computing, vol. 7, pp. 767-779 (2007); Li et al., *An unambiguous receiving technique for BOC(n,n) signal,* 2014 IEEE international conference on signal processing, communications and computing (2014 ICSPCC), pp. 379-383; Liu et al., *Double stroke technique for unambiguous tracking of TMBOC modulated signals in GPS,* IEEE signal processing letters, vol. 22, no. 12, pp. 2204-2208 (December 2015); Zhang et al., *Fast acquisition algorithm based on FFT for BOC modulated signals,* 2015 IEEE Region 10 Conference (TENCON 2015), pp. 1-6; Gallardo et al., *Code smoothing for BOC ambiguity mitigation,* 2013 International conference on localization and GNSS (2013 ICL-GNSS), pp. 1-6; Esteves 2014; Andrianarison 2016; Chen et al., *Combining L1 signals for improved sensitivity,* 2015 Institute of navigation (ION) international technical meeting, pp. 1-9 (January 2015) (hereinafter, "Chen 2015"); Macchi-Gernot et al., Combined acquisition and tracking methods of GPS L1 C/A and L1C signals, Int'l journal of navigation and observation, vol. 2010, Article Id. 190465, 19 pages (hereinafter, "Macchi-Gernot 2010"); Sun et al., *Channels combining techniques for a novel two steps acquisition of new composite GNSS signals in presence of bit sign transitions,* Position location and navigation symposium (PLANS 2010), 2010 IEEE/ION, May 4-6, 2010, pp. 443-457 (hereinafter referred to as "Sun 2010"), which are all incorporated by reference herein in their entirety.

At 210A, the present system logs (i.e., stores) 20 msecs of the calculated correlations of the I and Q components ($I_{C/A20}$, $Q_{C/A20}$) of the L1 C/A signal. If coherent combining is going to be performed, the L1 C/A signal would need to be data stripped, which is not required for non-coherent combining.

At 210B, the present system logs (i.e., stores) 10 msecs of the calculated correlations of the I and Q components of the L1C pilot signal ($I_{Cp10a}$, $Q_{Cp10a}$), and then logs (i.e., stores) another 10 msecs of the calculated correlations of the I and Q components ($I_{Cp10b}$, $Q_{Cp10b}$) of the L1C signal. In this embodiment, only the L1C pilot signal (L1C$_P$) is used, although the present disclosure is not so limited. There would be some benefit from using both the LC pilot signal (L1C$_P$) and data signal (L1C$_D$), but because of the relative weakness of the L1C$_D$ signal, the benefit would be relatively minor and data stripping would be required for coherent combining. Moreover, in this embodiment, the overlay signal/secondary code is also stripped from the L1C$_P$ signal, although the present disclosure is not so limited.

Although shown in parallel in FIG. 2, the operations with the "A" suffix do not have to run in parallel with the steps with the "B" suffix in all embodiments of the present disclosure and, for example, may be offset from each in time if desirable in a particular implementation, as would be understood by one of ordinary skill in the art.

At 220A, the present system determines from the derived data bit sign whether to flip the logged/stored 20 msecs of L1 C/A signal correlations ($I_{C/A20}$, $Q_{C/A20}$), while at 220B, the present system determines from the secondary code sign whether to flip the logged/stored 2×10 msecs of L1C$_P$ signal correlations ($I_{Cp10a}$, $Q_{Cp10a}$; $I_{Cp10b}$, $Q_{Cp10b}$). Herein, "flip" refers to changing the sign (or "polarity") of the correlation symbols, which, because the L1 C/A signal is BPSK modulated, is +1 and −1. In a general sense, 220A-220B may be considered as operations to "restore" the original signals as generated by the satellite by removing the data/phase modulation.

At 225B, the present system adds together the two logged/stored 10 msec L1C$_P$ signal correlations in order to generate 20 msec L1C$_P$ signal correlations ($I_{Cp20a}=I_{Cp10a}+I_{Cp10b}$; $Q_{Cp20a}=Q_{Cp10a}+Q_{Cp10b}$) which can be combined with the logged/stored 20 msecs of L1 C/A signal correlations ($I_{C/A20}$, $Q_{C/A20}$). In order to combine L1C$_P$ 10 msec segments to create a 20 msec period, prior knowledge (e.g., a LUT or the like) of the L1C$_P$'s secondary code can be used to determine data bit polarities.

At 230, the present system combines the 20 msecs of L1 C/A signal correlations ($I_{C/A20}$, $Q_{C/A20}$) and the 20 msec L1C$_P$ signal correlations ($I_{Cp20a}$, $Q_{Cp20a}$) in order to generate the combined signal L1C$_{COMB}$ having components $I_{COMB}$ and $Q_{COMB}$. See, e.g., Andrianarison 2016; Chen 2015; Macchi-Gernot 2010; and Sun 2010.

As mentioned above, these combined signals may be coherently combined or non-coherently combined. Non-coherent combining is clearly less optimal than coherent combining, as decoding reception systems using coherent combining can result in a 3 dB gain in signal-to-noise ratio (SNR) over systems not using the combining described herein, while non-coherent combining only results in a 1.5 dB gain, and non-coherent combining fails to cancel out correlation sidelobes to mitigate multipath effects. However, non-coherent combining is clearly simpler to implement (e.g., not requiring L1 C/A data stripping) and can be implemented "earlier" in the receive chain. Moreover, non-coherent combining can be easily performed when the underlying signals have different coherent periods.

In addition, embodiments of the present disclosure may use both coherent and non-coherent combining, changing from one to the other based on, for example, current signal conditions, current interference conditions, the current receive chain state, how individual components in the receive chain are performing, power consumption, GNSS solution accuracy, and/or an algorithm for maximizing/minimizing certain parameters. Embodiments of the present disclosure may be able to switch from not using a combining signal to using a combining signal on similar bases, or among all three options, i.e., no combining, non-coherent combining, and coherent combining.

Returning to 230, in order to combine the $L1C_P$ and L1 C/A signals coherently, the L1 C/A 50 Baud raw data bits must be known in order that the combined signals do not sum to zero because of their polarities. This information can be obtained in a variety of ways, as would be understood by one of ordinary skill in the art, including, for example, using terrestrial network aides or decoding data in the received satellite signal.

$Q_{COMB}$) or correlation window over time, providing dynamic real-time correction/guidance to the GNSS reception process.

As mentioned above in reference to FIGS. 1 and 2, extra information (i.e., "control bits") may be required for combining the two signals. In this embodiment in which the L1 C/A signal and the $L1C_P$ signal are combined, the data bit polarities needs to be known in order to perform 225B, i.e., combining the $L1C_P$ 10 msec segments to make a 20 msec segment to combine with the 20 msec segment of L1 C/A in 230.

In addition, at least one gain factor and a balancing factor are required in this embodiment of the present disclosure. In the modified BOC format of the L1 $C_P$ signal, only 10/11 ths of the signal actually carries the basic $L1C_P$ signal. Using only 10/11 ths of the signal results in a 0.41 dB signal loss, so total relative signal loss is 0.25−0.41=−0.16 dB. Thus, the $L1C_P$ coherent correlation needs to be raised by a gain factor of 0.16 dB before being combined with L1 C/A in 230. As discussed in greater detail in reference to FIGS. 3-4-5A-5B, a balancing factor is usually also required to normalize the peak amplitudes of the L1 C/A signal and the $L1C_P$ signal.

As would be understood by one of ordinary skill in the art, similar or identical factors would need to be taken into account depending on the different signals being combined in the implementation of the present disclosure.

A pseudocode example illustrating a possible implementation according to the embodiment of the current disclosure shown in FIG. 2 is shown below:

---

1A. L1 C/A coherent calculation:
    (i)    if( $I_{C/A20} > 0$ )
           $L1_{C/A\_data} = +1$
       else
           $L1_{C/A\_data} = -1$
       end
    (ii)   if( $L1_{C/A\_data} == -1$ )
           flip sign of $I_{C/A20}$ and $Q_{C/A20}$
       end
1B. $L1C_P$ coherent calculation:
    (i)    if( $L1-C_p > 0$)
           do nothing
       else
           flip sign of $I_{Cp10a}$, $Q_{Cp10a}$; $I_{Cp10b}$, $Q_{Cp10b}$.
       end
    (ii)   Sum $L1C_P$ across 20msecs:     $I_{Cp20} = I_{Cp10a} + I_{Cp10b}$
                                                             $Q_{Cp20} = Q_{Cp10a} + Q_{Cp10b}$
2. Combine L1 C/A and $L1C_P$ to generate $L1-C_{COMB}$:     $I_{comb} = I_{Cp20} + I_{C/A20}$
                                                                                         $Q_{comb} = Q_{Cp20} + Q_{C/A20}$

---

At 240, the resulting combined correlation $L1C_{COMB}$ ($I_{COMB}$, $Q_{COMB}$) or correlation window (i.e., with a range of delayed correlations for I and Q) can be used as input to provide control guidance for, e.g., signal tracking methods (code and carrier tracking), metrics (lock detection, CW detection) etc. Speaking generally, either or both of the two signals which are used to generate a combined signal according to the present disclosure may have improved reception by using the combined signal for, e.g., adjusting one or more parameters of at least one of tracking; acquisition; position, navigation, and/or timing (PNT) estimation, calculation, and/or correction; satellite/measurement selection or rejection; carrier frequency tracking/correlation; code frequency tracking/correlation; fault detection; fault correction; and multipath and/or non-line-of-sight (NLOS) signal mitigation.

Moreover, in embodiments of the present disclosure, the method in FIG. 2 is continually performed, to continually calculate a dynamically changing $L1C_{COMB}$ ($I_{COMB}$, As shown in the pseudocode above, coherent logging and calculation is first performed for both L1 C/A and $L1C_P$ in routines 1A and 1B, respectively. Accordingly, routines 1A and 1B correspond to 220A and 220B-225B, respectively, in FIG. 2.

In routine part (i) of routine 1A, the present system derives the data bit sign by determining if ($I_{CA20} > 0$), in which case the derived data bit sign is +1. If not, the derived data bit sign is −1. In routine part (ii) of routine 1A, the present system decides whether to flip the 20 msec L1 C/A signal correlations ($I_{C/A20}$, $Q_{C/A20}$) based on the derived data bit from routine part (i). If the derived bit is −1, the present system flips the sign of the 20 msec L1 C/A signal correlations ($I_{C/A20}$, $Q_{C/A20}$). Otherwise, they are not flipped.

In routine part (i) of routine 1 B, the present system decides whether to flip the two 10 msec $L1C_P$ signal correlations ($I_{Cp10a}$, $Q_{Cp10a}$; $I_{Cp10b}$, $Q_{Cp10b}$) based on the secondary code sign or polarity, i.e., ($L1-C_p > 0$). If ($L1-C_p > 0$), the present system does not flip the two 10 msec L1C$_P$ signal correlations. Otherwise, the sign of the two 10 msec L1C$_P$ signal correlations ($I_{Cp10a}$, $Q_{Cp10a}$; $I_{Cp10b}$, $Q_{Cp10b}$) are flipped. In routine part (ii) of routine 1B, the present system combines together the two 10 msec L1C$_P$ signal correlations to form a 20 msec L1C$_P$ signal correlation ($I_{Cp20}$, $Q_{Cp20}$).

At routine 2, the present system combines the 20 msecs of L1 C/A signal correlations ($I_{C/A20}$, $Q_{C/A20}$) and the 20 msec L1C$_P$ signal correlations ($I_{Cp20}$, $Q_{Cp20}$) in order to generate the combined signal L1C$_{COMB}$ having components $I_{COMB}$ and $Q_{COMB}$.

Figure 3:
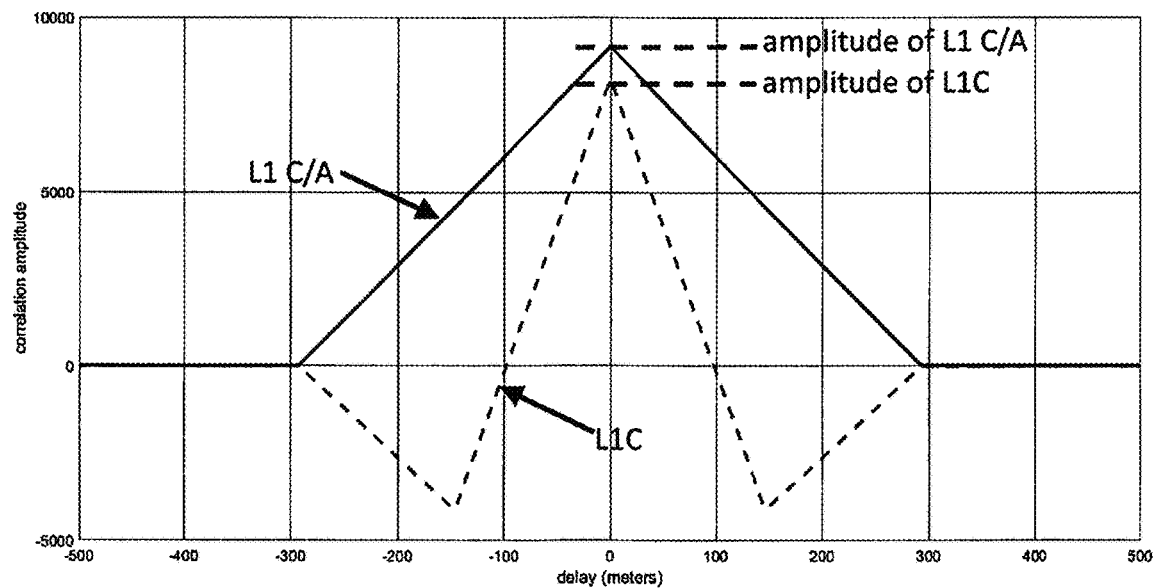
FIG. 3 illustrates an exemplary plot of correlation amplitude/delay for showing separate L1 C/A and L1C signals, according to an embodiment of the present disclosure.

FIG. 3 illustrates an exemplary plot of correlation amplitude/delay for showing separate L1 C/A and LC signals, according to an embodiment of the present disclosure. The dotted line representing the L1C signal has its distinctive three peak shape (one up, two down) and, at least in the example of FIG. 3, has a highest correlation amplitude lower than the highest correlation amplitude of the L1 C/A signal, which is represented by the solid line. The three peak shape of the L1C signal can make it difficult for a GNSS receiver to identify the "true" main peak of the three peaks in the L1C signal when comparing magnitudes.

Figure 4:
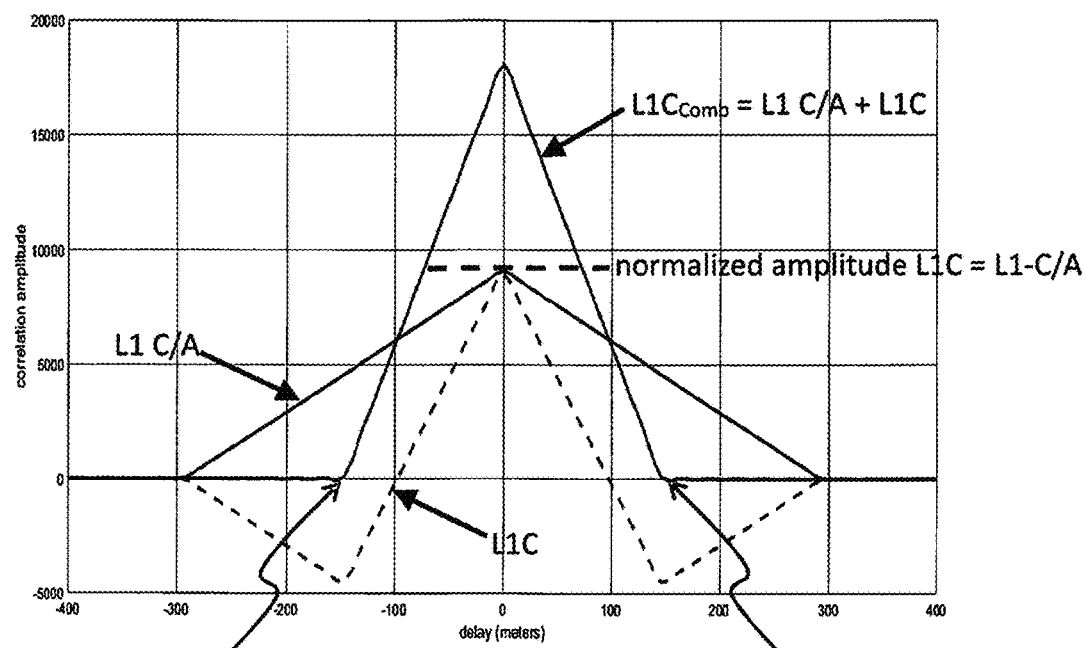
FIG. 4 illustrates an exemplary plot of correlation amplitude/delay for showing a combined correlation $L1C_{COMB}$ signal, according to an embodiment of the present disclosure.

FIG. 4 illustrates an exemplary plot of correlation amplitude/delay for showing a combined correlation L1C$_{COMB}$ signal, according to an embodiment of the present disclosure.

As shown in FIG. 4, the amplitudes of the separate L1 C/A and L1C signals have been normalized such that their highest correlation amplitudes are the same. The need for such normalization and a procedure for performing such normalization are discussed in further detail below. As shown in FIG. 4, the L1C$_{COMB}$ signal according to embodiments of the present disclosure is a clear and strong signal, making it much easier to detect/recognize. Using the L1C$_{COMB}$ signal with its single unambiguous peak as a guide, it is much easier to determine which one of the 3 peaks in the L1C signal is the "true" highest peak. Using the technology disclosed herein, the L1C$_{COMB}$ signal may be generated and used as a single stable track point for the code tracking loop.

Moreover, the L1C$_{COMB}$ signal according to embodiments of the present disclosure shown in FIG. 4 not only has a clear and strong signal, but a clear demarcations of the zero points 410 and 420, where the correlation amplitude of the L1C$_{COMB}$ signal hits zero. Because, as shown by zero points 410 and 420, the correlation amplitude shape of the L1C$_{COMB}$ signal has zero amplitude for signals beyond approximately ±145 meters, the waveform is resistant to multipath at and beyond zero points 410 and 320.

However, such an optimally shaped L1C$_{COMB}$ signal is only possible if the amplitudes of the separate L1 C/A and L1C signals are normalized to have the same highest amplitude peak.

Figure 5:
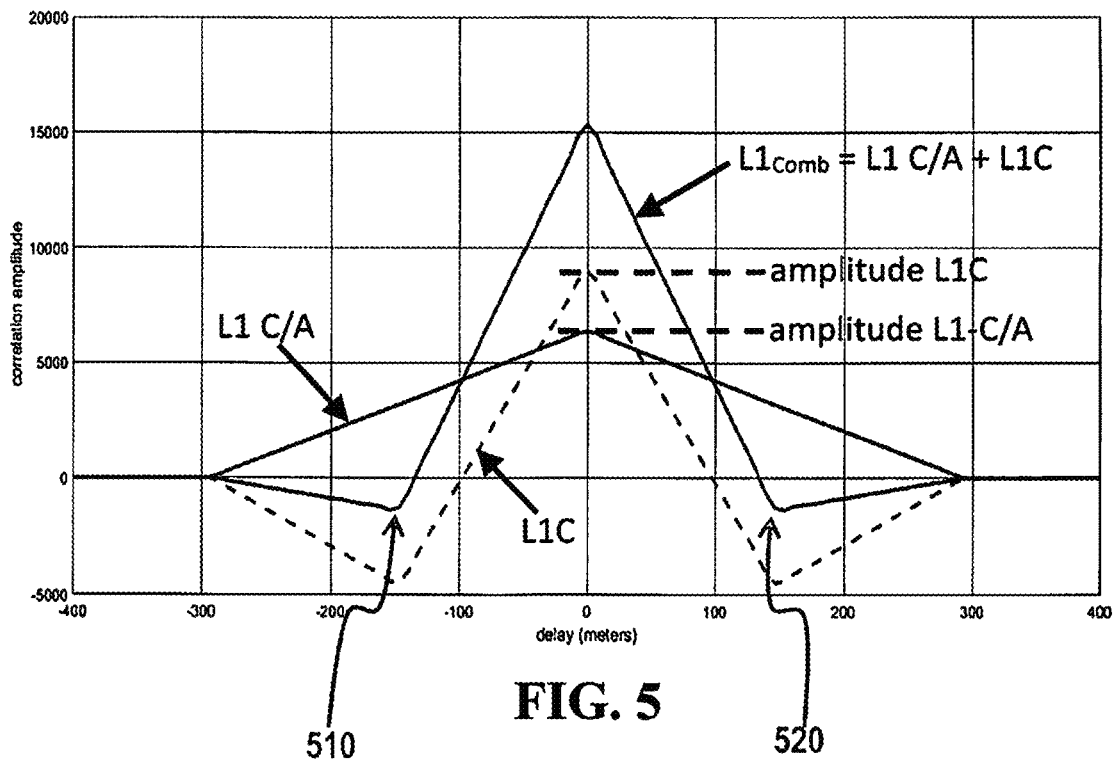
FIG. 5 illustrates an exemplary plot of correlation amplitude/delay when the $L1C_{COMB}$ signal is generated from L1 C/A and L1C signals that have not been normalized to have a common amplitude peak, according to an embodiment of the present disclosure.
Figure 6:
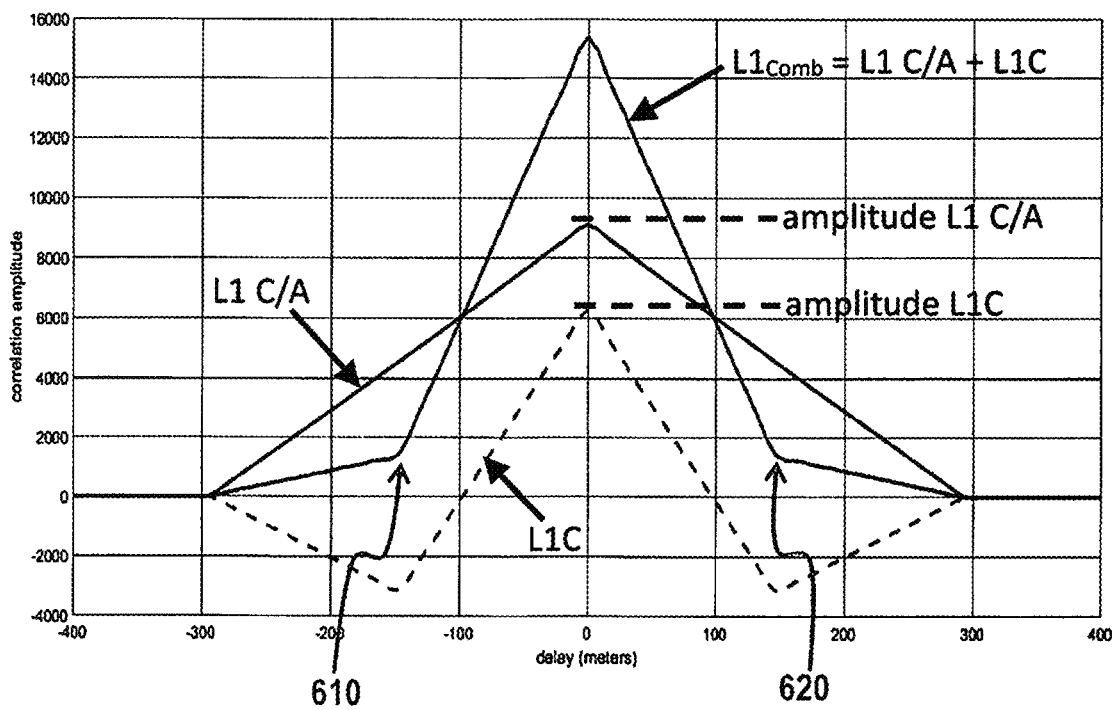
FIG. 6 illustrates another exemplary plot of correlation amplitude/delay when the $L1C_{COMB}$ signal is generated from L1 C/A and L1C signals that have not been normalized to have a common amplitude peak, according to an embodiment of the present disclosure.

FIGS. 5 and 6 illustrate exemplary plots of correlation amplitude/delay when the L1C$_{COMB}$ signal is generated from L1 C/A and LC signals that have not been normalized to have a common amplitude peak, according to an embodiment of the present disclosure.

In the example shown in FIG. 5, the highest amplitude peak of the L1C signal is greater in height than the highest amplitude peak of the L1 C/A signal. As a result, if the method described in reference to FIG. 2 is performed using these signals, the resulting L1C$_{COMB}$ signal has the shape indicated in FIG. 5. More specifically, the lowest points 510 and 520 demarcating the peak of the L1C$_{COMB}$ signal have negative amplitudes, thus failing to provide accurate zero points beyond which the waveform may be resistant to multipath.

In the example shown in FIG. 6, the highest amplitude peak of the L1C signal is less in height than the highest amplitude peak of the L1 C/A signal. As a result, if the method described in reference to FIG. 2 is performed using these signals, the resulting L1C$_{COMB}$ signal has the shape indicated in FIG. 6. More specifically, the lowest points 610 and 620 demarcating the peak of the L1C$_{COMB}$ signal have positive amplitudes, thus failing to provide accurate zero points beyond which the waveform may be resistant to multipath.

Accordingly, as shown in reference to FIGS. 5 and 6, a gain factor, or, as referred to below in reference to FIG. 7, a balancing factor β is needed to balance out/normalize the peak amplitudes of the signals being combined for the method according to the present disclosure to work most effectively.

Although the ICDs for the various GNSS signals list nominal transmit and receive power values, in reality, their power values may vary significantly from the listed values in their ICDs. Thus, regardless of which GNSS signals are being combined in accordance with embodiments of the present disclosure, it is likely a gain factor/balancing factor β will be needed to balance out/normalize the peak amplitudes of the GNSS signals being combined for the method according to the present disclosure to work most effectively.

Reasons for this receive power imbalance (in the sense of being out of balance with the ratio expected from their ICDs) include, but are not limited to, SV transmitter aging and/or malfunctioning, the actual SV transmission power once activated being different from the ICD, unique regional conditions, etc., as would be understood by one of ordinary skill in the art. As mentioned above, there are also imbalances indicated in their ICDs, such as the L1 C1$_P$ signal having +0.25 dB more nominal power than the L1 C/A signal, but also because of the TMBOC modulation of the L1 C1$_P$ signal, the L1 C1$_P$ signal having a relative −0.41 dB signal loss, resulting in the L1 C1$_P$ signal having a total relative signal loss of 0.25 dB−0.41 dB=−0.16 dB in relation to the nominal power of the L1 C/A signal, as defined by their ICDs.

In embodiments of the present disclosure, the real world power ratio between the signals to be combined is measured and provided in some form to the GNSS receiver. In some embodiments, the measurements and their results may be both made and stored by the GNSS receiver. In such a case, the GNSS receiver could make real-time power ratio measurements while performing the combining algorithm in accordance with the present disclosure, but, in terms of present technology, this would likely be too resource-intensive to be continually performed and less than optimal as the suitable high quality signal conditions are seldom present for most GNSS receivers, particularly when in challenging environments, such as an urban area. Most likely, in such a case, the GNSS receiver would measure and store the power ratio measurements once, such as upon activation at an appropriate high quality reception location, periodically, and/or aperiodically (and possibly in parts), such as whenever the GNSS receiver detects it is in a high quality signal reception environment and, optionally, not being otherwise used.

In other embodiments, measurements may be made at an appropriate regional locations and/or networks and transmitted to the GNSS receivers to be stored and used and, when necessary, updated by the regional locations/networks.

For example, the GNSS receiver may download these power ratio factors only once, when first activated. There are many possible variations, as would be understood by one of ordinary skill in the art, including combining two or more of the approaches listed above.

Figure 7:
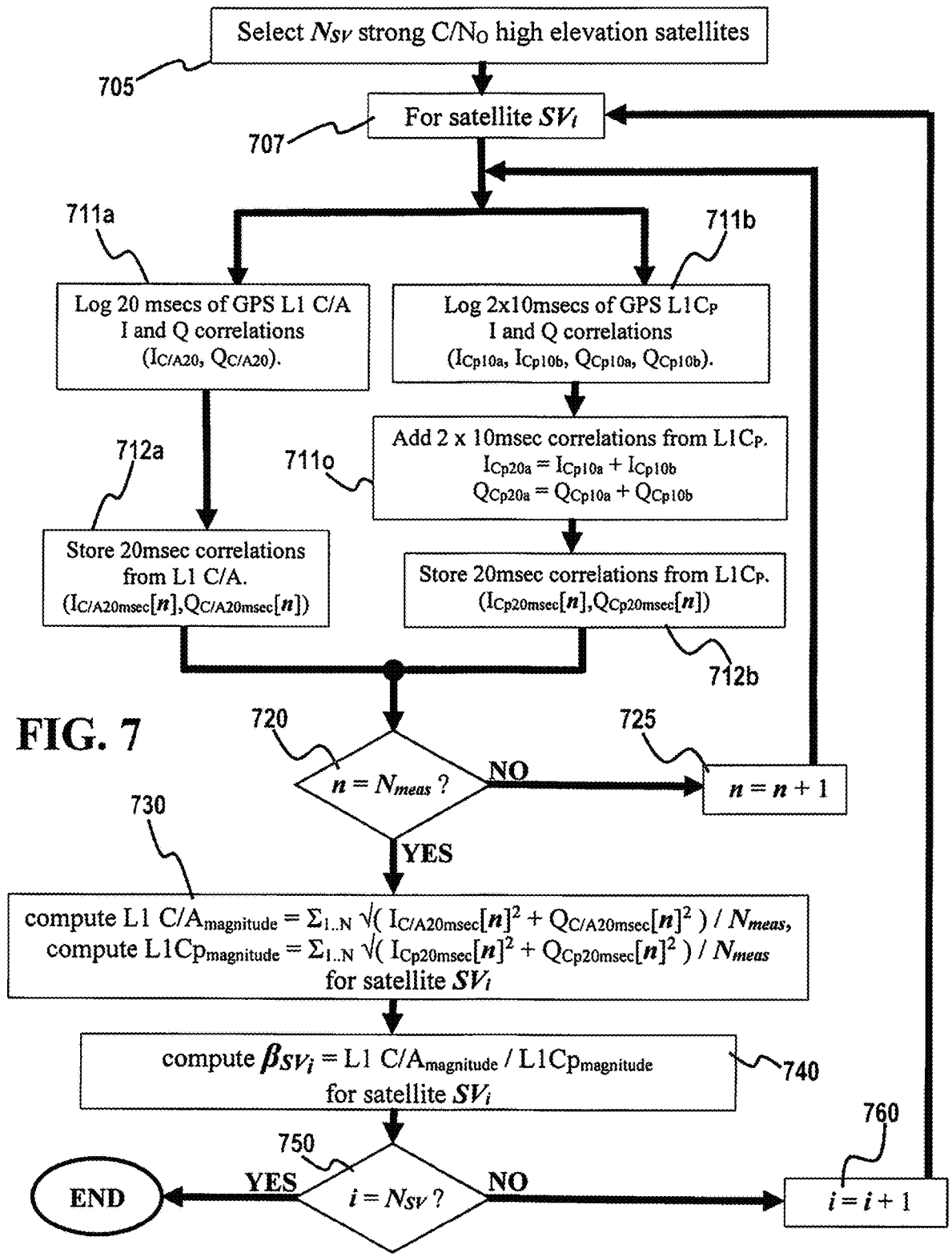
FIG. 7 illustrates an exemplary flowchart for generating balancing $\beta$ factors for a plurality of SVs, according to an embodiment of the present disclosure.

FIG. 7 illustrates an exemplary flowchart for generating balancing β factors for a plurality of SVs, according to an embodiment of the present disclosure. Each balancing factor $\beta SV_i$ indicates the ratio of amplitudes between the L1 C/A and L1C signals for a specific SV (i.e., $SV_i$).

Before starting the method in FIG. 7, a suitable location must be found, where there is as much open sky as possible, as few objects/buildings in the vicinity which might cause multipath signal problems, as few possible interference sources as possible, etc., as would be understood by one of ordinary skill in the art. As mentioned above, according to embodiments of the present disclosure, this could be done at an appropriate fixed location GNSS receiver whose calculated balancing β factors are transmitted to GNSS receivers in the vicinity, or randomly by any GNSS receiver if it detects optimal conditions for making such measurements, or a group of multiple sets of balancing β factors may be pre-stored in a GNSS receiver, where each set corresponded to a vicinity in which they should be used, or wirelessly connected GNSS receivers may measure, calculate, and/or share balancing β factors as their own networked group, etc., as would be understood by one of ordinary skill in the art.

At 705, a set of SVs in view is selected for calculating the balancing β factors. In this embodiment, the set of SVs are selected based on their C/No and their elevation, which could be done by having a set threshold for each value, below which the SV will not be selected. The total number of selected SVs is $N_{SV}$. As would be understood by one of ordinary skill in the art, any number of measurements, factors, or parameters may be used to select the set of $N_{SV}$ satellites. Similarly, any number of measurements, factors, or parameters may be used to select the number $N_{SV}$ of satellites in the measurement set. In other embodiments, the number $N_{SV}$ of satellites in the measurement set may be a dynamic variable changeable/set based on current conditions during the measurement procedure.

Next, each satellite has a series of measurements taken to determine their balancing β factor. In FIG. 7, the set index for the satellites is i={1, 2, . . . , $N_{SV}$}. Starting at 707, for each $SV_i$, the calculations at 711a-711b-712a-711o-712b, which are substantially identical to 210A-210B-220A-220B-225B in FIG. 2, are repeatedly made. In other words, in each traverse of this inner loop in FIG. 7, the measurements/calculations ($I_{C/A20msec}[n], Q_{C/A20msec}[n]; I_{Cp20msec}[n], Q_{Cp20msec}[n]$) are made and stored, where is n={1, 2, . . . , $N_{meas}$} is the set index for the number of measurements, which is $N_{meas}$ per satellite.

At 720, it is determined whether all of the measurements have been made for satellite $SV_i$ (n=$N_{meas}$?→NO). If not, the index n is incremented at 725 (n=n+1) and another measurement/calculation is made by going through loop 711a-711b-712a-711o-712b again. When all of the measurements have been made for satellite $SV_i$(n=$N_{meas}$?→YES), the process continues to 730.

The number $N_{meas}$ of measurements per satellite may be selected based on a number of factors, some of which may be specific to the particular implementation and usage of the GNSS receiver, as would be understood by one of ordinary skill in the art. However, $N_{meas}$ should always be large enough to guarantee an accurate estimation of the signal power ratio between the two signals, as would also be understood by one of ordinary skill in the art. In this embodiment, $N_{meas}$=180,000 (180K), which would be equivalent to an hour of measurements per satellite (20 msec×180K=3600 seconds=60 minutes). In other embodiments, the number $N_{meas}$ of measurements may be varied for each SV (i.e., $N_{meas}[SV_i]$) and/or may be a dynamic variable changeable based on current conditions during the measurement procedure.

At 730, after all of the measurements for satellite $SV_i$ have been made (when n=$N_{meas}$?→YES in 720), average magnitudes L1 $C/A_{magnitude}$ and $L1C_{magnitude}$ of $SV_i$ are calculated from the stored measurements, as shown by Equations (2)(a) and (2)(b) below:

$$L1C/A_{magnitude} = \sum_{n=1}^{N_{meas}} \sqrt{\frac{I_{C/A20msec}[n]^2 + Q_{C/A20msec}[n]^2}{N_{meas}}} \qquad (2)(a)$$

$$L1Cp_{magnitude} = \sum_{n=1}^{N_{meas}} \sqrt{\frac{I_{Cp20msec}[n]^2 + Q_{Cp20msec}[n]^2}{N_{meas}}} \qquad (2)(b)$$

At 740, the average magnitudes L1 $C/A_{magnitude}$ and $L1C_{pmagnitude}$ of $SV_i$ calculated in 730 are used to determine $\beta SV_i$, which is the ratio indicated in Equation (3) below:

$$\beta_{SVi} = \frac{L1C/A_{magnitude}}{L1Cp_{magnitude}} \qquad (3)$$

This value $\beta SV_i$, is stored as the balancing factor between L1 C/A and $L1C_P$ signals of satellite $SV_i$. After storing $\beta SV_i$, for satellite $SV_1$, it is determined whether there are any more satellites in the selected set of satellites for which $\beta SV_i$ needs to be measured/calculated at 750 (i=$N_{SV}$?).

If it is determined $\beta SV_i$ has been calculated for all of the selected satellites (i=$N_{SV}$?→YES), the method ends. If not (i=$N_{SV}$?→NO), the index i is incremented at 760 (i=i+1) and another set of measurements/calculations are made for the next satellite in the selected set of satellites by going back to 707.

Because the receive power ratio between the GPS L1 C/A and GPS $L1C_P$ signals of a given satellite is expected to remain largely constant over time, it is unlikely the method of FIG. 7 would need to be repeated for this embodiment because, as discussed above, even if updates are made, the updates may be detected and provided by an external source (such as a network/central location), rather than the GNSS receiver performing the method of FIG. 7 again. In another embodiment, the GNSS receiver may be signaled to perform FIG. 7 again, but only for a particular satellite, group of satellites, a newly operational satellite, etc.

As mentioned above, the combined signal generated in accordance with the present disclosure can be used in a variety of ways to mitigate the effects of multipath and NLOS signals,[1] such as when, for example, attempting to detect the true peaks of the separate signals, as shown in FIG. 4. However, this is only one example of how the combining algorithm and the combined signal generated by the combining algorithm in accordance with the present disclosure can be used in techniques for mitigating the effects of multipath and NLOS signals, as would be understood by one of ordinary skill in the art. See, e.g., Bhuiyan et al., *Multipath mitigation techniques for satellite-based positioning applications*, Chapter 17, pp. 405-426, Global navigation satellite systems: signal, theory and applications, In; Jin, S., ed. (InTech: Rijeka, Croatia, 2012) (hereinafter referred to as "GNSSs: signal, theory and applications, chap. 17"); Bhuiyan, M. Z. H., *Analysis of multipath mitigation techniques for satellite-based positioning applications*, Ph.D. thesis, Tampere Univ. of Technology (2011) (hereinafter referred to as "Bhuiyan 2011"); Pirsiavash et al., *Characterization of signal quality monitoring techniques for multipath detection in GNSS applications*, Sensors 2017, 17, 1579; Bhuiyan et al., *Code tracking algorithms for mitigating multipath effects in fading channels for satellite-based positioning*, EURASIP journal on advances in signal processing, vol. 2008, Article ID 863629, 17 pages (2008); Groves et al., *Intelligent urban positioning, shadow matching and non-line-of-sight signal detection*, 2012 6$^{th}$ ESA workshop on satellite navigation technologies and european workshop on GNSS signals and signal processing (NAVITEC), Dec. 5-7, 2012; Bhuiyan et al., *Advanced multipath mitigation techniques for satellite-based positioning applications*, International journal of navigation and observation, vol. 2010, article ID 412393, 15 pages (2010); Jovanovich et al., *Multipath mitigation techniques for CBOC, TMBOC and AltBOC signals using advanced correlators architectures*, 2010 Position location and navigation symposium (PLANS), 2010 IEEE/ION, May 4-6, 2010, pp. 1127-1136 (hereinafter referred to as "Jovanovich 2010"); Rouabah et al., *GPS/Galileo multipath detection and mitigation using closed-form solutions*, Mathematical problems in engineering, vol. 2009, article ID 106870, 20 pages (hereinafter referred to as "Rouabah 2009"); Chen et al., *Direct comparison of the multipath performance of L1 BOC and C/A using on-air Galileo and QZSS transmissions*, Position, location and navigation symposium (PLANS 2014), 2014 IEEE/ION, Jul. 24, 2014, pp. 443-457 (hereinafter referred to as "Chen 2014"); Bhuiyan et al., *Analysis of multipath mitigation techniques with land mobile satellite channel model*, Radioengineering, vol. 21, no. 4, pp. 1067-1077 (December 2012); Brocard et al., *Performance evaluation of multipath mitigation techniques for critical urban applications based on a land mobile satellite channel model*, Position, location and navigation symposium (PLANS 2014), May 2014 (IEEE/ION PLANS 2014), pp. 612-625; and Amani et al., *GPS multipath detection in the frequency domain*, Proceedings of the 2016 European navigation conference (ENC 2016), May 2016, Helsinki, Finland, all of which are incorporated by reference in their entirety. As would be understood by one of ordinary skill in the art, embodiments of the present disclosure may be used to improve most of the mitigation techniques discussed in the preceding list of incorporated documents.

[1] For the difference between multipath and NLOS signals, see, e.g., Petrovello, M., Multipath vs. NLOSsignals: How does non-line-of-sight reception differ from multipath interference? Inside GNSS, November-December 2013, pp. 40-44, which is incorporated by reference herein in its entirety.

For example, embodiments of the present disclosure may be used in GNSS receivers using some form of peak tracking for multipath mitigation. See, e.g., Bhuiyan et al., *Peak tracking algorithm for Galileo-based positioning in multipath fading channels*, Proc. of IEEE international conference on communications, 24-28 Jun. 2007, Glasgow, Scotland, pp. 5927-5932; Hu et al., *An efficient method for GPS multipath mitigation using the Teager-Kaiser-Operator-based MEDLL*, Radioengineering, Vol. 22, No. 4, pp. 1202-1210 (December 2013); Bhuiyan et al., *A slope-based multipath estimation technique for mitigating short-delay multipath in GNSS receivers*, Proc. of IEEE international symposium on circuits and systems, 30 May-2 Jun. 2010, Paris France, pp. 3573-3576; and Sharp et al., *Peak and leading edge detection for time-of-arrival estimation in band-limited positioning systems*, Institute of engineering and technology (IET) Communications, vol. 3, issue 10, pp. 1616-1627 (2009), all of which are incorporated by reference in their entirety; see also GNSSS: signal, theory and applications, chap. 17, pp. 414-417; Bhuiyan 2011, pp. 44-50; Jovanovich 2010; and Rouabah 2009.

Figure 8:
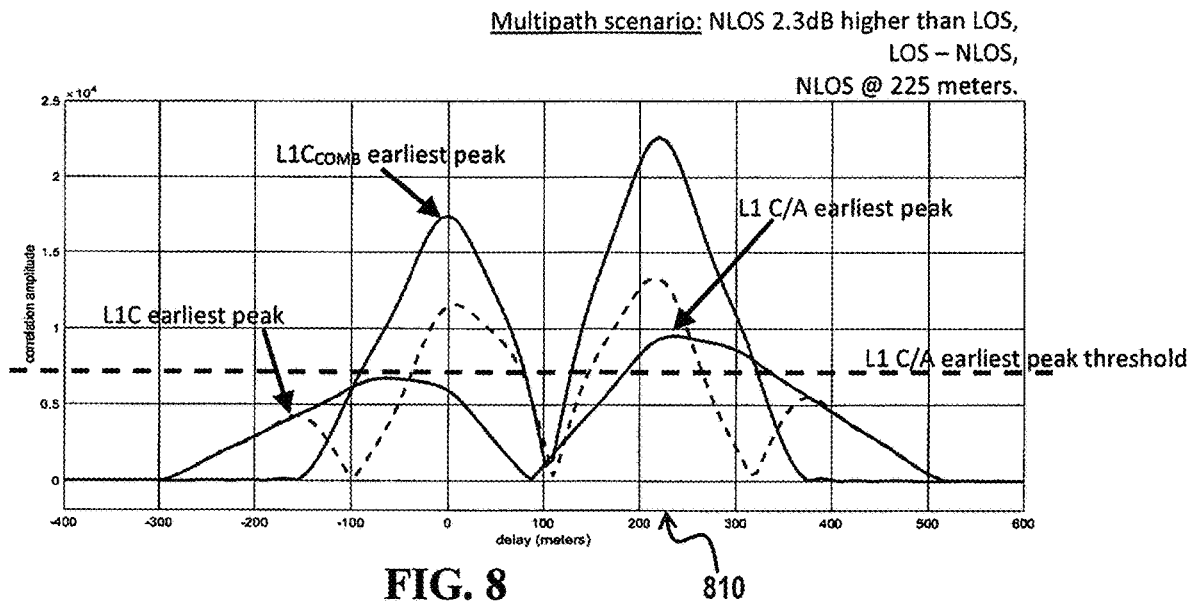
FIG. 8 illustrates a multipath/NLOS scenario where the $L1C_{COMB}$ signal improves detection of an earliest arriving peak of each separate L1 C/A and L1-$C_P$ signals, according to an embodiment of the present disclosure.
Figure 9:
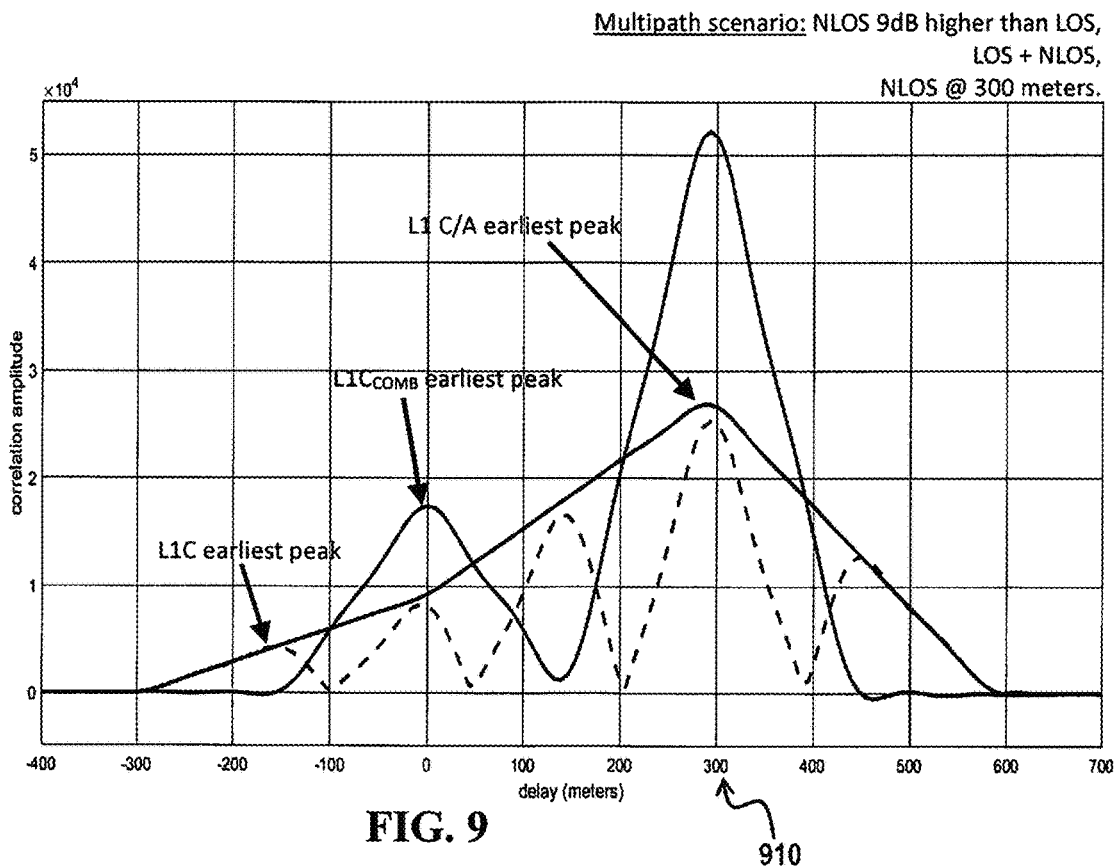
FIG. 9 illustrates another multipath/NLOS scenario where the $L1C_{COMB}$ signal improves detection of an earliest arriving peak of each separate L1 C/A and L1-$C_P$ signals, according to an embodiment of the present disclosure.

FIGS. 8 and 9 illustrate two multipath/NLOS scenarios where the L1C$_{COMB}$ signal improves detection of earliest arriving peaks of each separate L1 C/A and L1 C$_P$ signals, according to embodiments of the present disclosure.

In FIG. 8, the received NLOS signal is 2.3 dB stronger than the actual received LOS signal, where the NLOS signal gives the incorrect location 810 at 225 meters from the actual location. Accordingly, both the L1 C/A signal and L1 C$_P$ signal are "misshapen," where the L1 C$_P$ signal has four peaks, the first of which is not the correct "earliest" peak, and the L1 C/A signal has two peaks, where the first, more accurate peak is beneath the established threshold (indicated by the horizontal dotted line) for detecting the L1 C/A signal peak so the second peak is recognized as the "earliest" peak of the received L1 C/A signal. However, the earliest peak of the L1C$_{COMB}$ signal correctly indicates where the earliest peaks of both the L1 C/A and L1 C$_P$ signals would be located, if the multipath/NLOS signal was not present.

In FIG. 9, the received NLOS signal is 9 dB stronger than the actual received LOS signal, where the NLOS signal gives the incorrect location 910 at 300 meters from the actual location. Accordingly, the L1 C$_P$ signal has five peaks, the first of which is not the correct earliest peak, and the L1 C/A signal has only a single peak, located at the incorrect location indicated by the NLOS signal, which is thus recognized as the earliest peak of the received L1 C/A signal. However, once again, the earliest peak of the L1C$_{COMB}$ signal correctly indicates where the earliest peaks of both the L1 C/A and L1 C$_P$ signals would be located, if the multipath/NLOS signal was not present.

Accordingly, in the examples shown in FIGS. 8 and 9, while each of the L1 C/A and L1 C$_P$ signals would separately provide incorrect earliest peak locations, thereby causing wrong range measurement calculations, the combined L1C$_{COMB}$ signal according to an embodiment of the present disclosure would effectively correct/adjust for those errors, thereby preventing wrong range measurement calculations.

While the descriptions above have focused on an embodiment where the combined signals were from the same GNSS (i.e., GPS) and even from the same satellite, as stated above, the present disclosure is not so limited, and embodiments of the present disclosure may combine suitable signals from different GNSSs, which would require appropriate modifications based on the GNSS signals involved.

For example, in embodiments of the present disclosure where the L1 signals from QZSS SVs and GPS SVs are combined, numerous differences would need to be taken into account, as would be understood by one of ordinary skill in the art, and as could be initially determined from their corresponding ICDs (in this case, IS-GPS-200, IS-GPS-800, and ISRO-IRNSS-ICD-SPS-1.1). For instance, each set of combined GPS L1 C/A and L1C signals are transmitted from a single satellite using the same carrier frequency and timing, but with different phases. To be exact, the GPS L1 C/A signal is transmitted at quadrature to both the GPS L1C$_D$ and L1C$_P$ signals, which are both transmitted in-phase and are thus (relatively) in-phase when received by the GNSS receiver.

Figure 10:
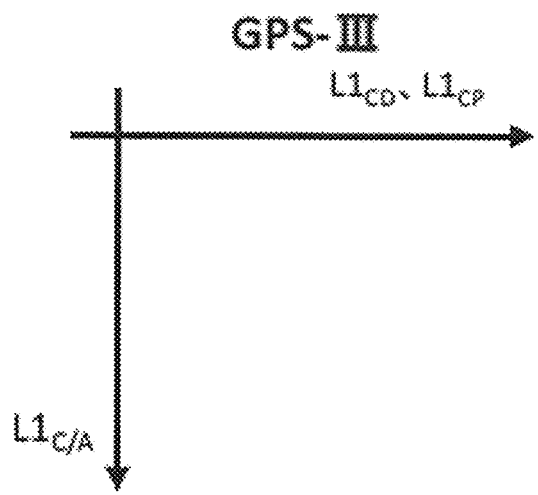
FIG. 10 illustrates an exemplary diagram of the carrier phase relationships of the GPS L1 C/A signal, $L1C_D$ signal, and $L1C_P$ signal, according to an embodiment of the present disclosure.
Figure 12:
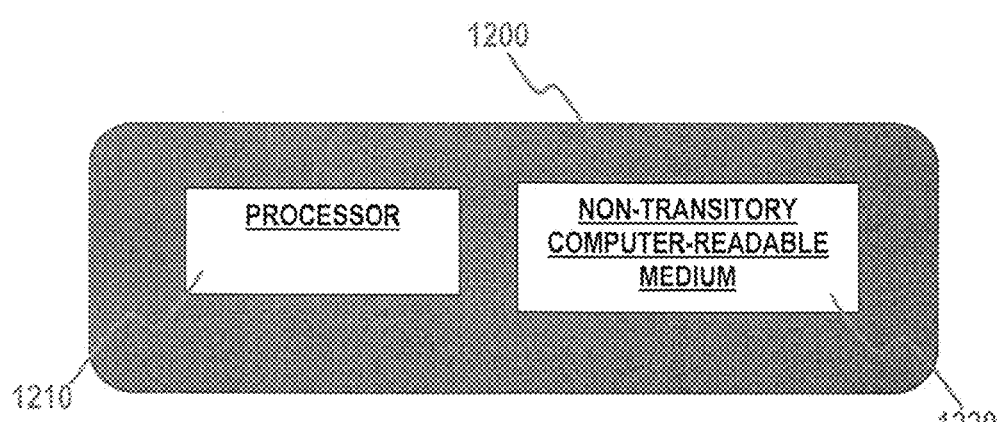
FIG. 12 illustrates an exemplary diagram of the present system, according to an embodiment of the present disclosure.

FIG. 10 illustrates an exemplary diagram of the carrier phase relationships of the GPS L1 C/A signal, L1C$_D$ signal, and L1C$_P$ signal, according to an embodiment of the present disclosure. FIG. 12 illustrates an exemplary diagram of the carrier phase relationships of the QZSS L1 C/A signal, L1C$_D$ signal, and L1C$_P$ signal, according to an embodiment of the present disclosure.

Figure 11:
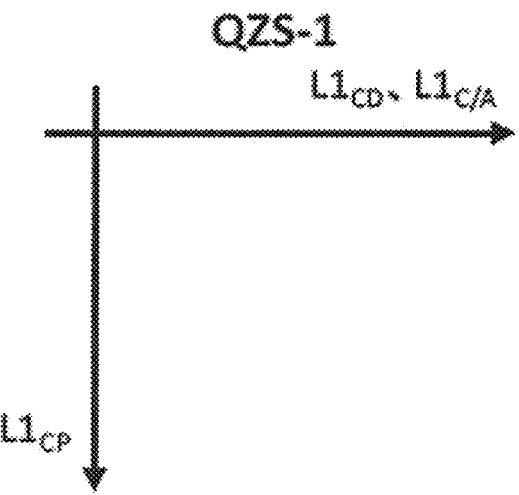
FIG. 11 illustrates an exemplary diagram of the carrier phase relationships of the QZSS L1 C/A signal, $L1C_D$ signal, and $L1C_P$ signal, according to an embodiment of the present disclosure.

As shown in FIGS. 10 and 11, while both the GPS L1C$_D$ and L1C$_P$ signals are in-phase, the QZSS L1C$_P$ signal is transmitted at quadrature to the in-phase QZSS L1C$_D$ signal—i.e., the pilot and data signals making up the QZSS L1C signal are received by the GNSS receiver with a 90° phase difference between them. Moreover, the QZSS L1 C/A signal is transmitted in-phase with the QZSS L1C$_D$ signal, but at a 90° phase difference from the GPS L1 C/A signal.

Accordingly, an embodiment combining L1 signals from QZSS SVs and GPS SVs would require certain modifications obvious to one of ordinary skill in the art. Namely, the I and Q components of signals that are in-phase may be simply added/combined, while for signals at a 90° phase difference, the I component of one signal is added/combined with the Q component of the other signal, and vice-versa. As would also be understood by one of ordinary skill in the art, these changes may be made in hardware, software, or a combination of the two.

In any event, such differences in signal features, such as phase relationships, are critical and must be taken into account when implementing an embodiment of the present disclosure for combining signals. The corresponding ICDs will provide the most important primary source for such signal features when implementing an embodiment of the present disclosure, while, as discussed above, the real world variances from the nominal ICD specifications can be handled by using factors based on real world measurements, calculations, and/or estimates, such as the gain/balancing β factor between the different signal receive powers in FIG. 6.

Moreover, as shown and discussed above, whether functions such as data stripping are available in an implementation of an embodiment of the present disclosure and, even if functions such as data stripping are available (as they are common in most GNSS receivers), should such functions be used continuously, or only based on certain conditions/parameters, or not at all, need to be considered. For example, depending on the circumstances, an implementation of an embodiment of the present disclosure may always use coherent combining, or dynamically switch between coherent and non-coherent combining (and also, optionally, not using the combining algorithm at all at certain times), or even be limited to non-coherent combining because data stripping is not available or for reasons of, e.g., design and resource management. On the other hand, when combining with WAAS-like signals, such as the QZSS SAIF signal, data stripping is required. As another example, in any combination that cancels signal sidelobes, correlator shaping will need to be available when implementing an embodiment of the present disclosure.

As also shown above, embodiments of the present disclosure can greatly simplify multipath problems, particularly when BOC signals are being used, and can improve overall SNR for the GNSS receiver. Embodiments of the present disclosure provide relatively uncomplicated solutions to the correlation and other problems caused by the three peaked BOC signal. Embodiments of the present disclosure may be considered for combining a wide variety of present and future GNSS signals, such as the Galileo E1-B and E1-C signals.

Accordingly, as would be understood by one of ordinary skill in the art, embodiments of the present disclosure may improve multipath and/or non-line-of-sight (NLOS) signal mitigation; reduce resources required for, and/or increase efficiency of, GNSS signal separation; reduce resources required for, and/or increase efficiency of, carrier frequency tracking/correlation and/or code frequency tracking/correlation; reduce resources required for, and/or increase efficiency of, at least one of tracking; acquisition; position, navigation, and/or timing (PNT) estimation, calculation, and/or correction; reduce resources required for, and/or increase efficiency of, satellite/measurement selection or rejection; and reduce resources required for, and/or increase efficiency of, fault detection and/or correction.

FIG. 12 illustrates an exemplary diagram of the present apparatus, according to one embodiment. An apparatus 1200 includes at least one processor 1210 and one or more non-transitory computer readable media 1220. The at least one processor 1210, when executing instructions stored on the one or more non-transitory computer readable media 1220, performs the steps of storing a first correlated GNSS signal over a first period; storing a second correlated GNSS signal over a second period; if the first period is not the same length as the second period, continue storing at least one of the first correlated GNSS signal over one or more additional first periods and the second correlated GNSS signal over one or more additional second periods until the total stored first correlated GNSS signal and the total stored second correlated GNSS signal are the same length of time; if necessary to combine the total stored first GNSS signal and the total stored second GNSS signal, modifying one or more stored first periods of the first correlated signal and/or one or more stored second periods of the second correlated signals; generating a combined GNSS signal by combining the total stored and modified first GNSS signal and the total stored and modified second GNSS signal; and using the combined GNSS signal to adjust reception of at least one of the first GNSS signal and the second GNSS signal. Moreover, the one or more non-transitory computer-readable media 1220 stores instructions for the at least one processor 1210 to perform the aforesaid steps.

The steps and/or operations described above in relation to an embodiment of the present disclosure may occur in a different order, or in parallel, or concurrently for different epochs, etc., depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Various embodiments of the present disclosure may be implemented in an integrated circuit (IC), also called a microchip, silicon chip, computer chip, or just "a chip," as would be understood by one of ordinary skill in the art, in view of the present disclosure. Such an IC may be, for example, a broadband and/or baseband modem chip.

One or more processors, simple microcontrollers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software. More specifically, depending on the embodiment of the present disclosure, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware, hardware, and/or any combination thereof.

A "processor" as used herein refers to any device configured to perform one or more operations based on instructions, including, but not limited to, any general purpose processor in communication with a storage medium from which computer-readable instructions can be retrieved, any special-purpose processor configured to execute specific types of instructions (such as a Digital Signal Processor or DSP), any special-purpose processor where some or all of the instructions are hard-wired into the actual processor design, any combination thereof, and/or any other type of processor. A processor as used herein may take any form, from a simple micro-controller to a completely self-contained computing system having a bus, memory controller, cache, etc., to a group or cluster of computing devices networked together to provide greater processing capability (e.g., distributed computing). A processor as used herein may have one or more cores, and a multi-core processor used to implement an embodiment of the present disclosure may be symmetric or asymmetric. A processor as used herein may include, without limitation, one or more ASICs, standard integrated circuits, controllers executing appropriate instructions, and including microcontrollers and/or embedded controllers, FPGAs, CPLDs, microprocessors, and the like.

The term "non-transitory computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, EEPROM, any other memory chip or cartridge, or any other medium on which instructions which can be executed by a processor are stored.

Thus, methods according to embodiments of the present disclosure may be implemented by devices constructed to perform the operations (such as hardware circuits), or implemented as programs and/or higher-level instructions to be provided to one or more processors for performance/implementation (such as instructions stored in a non-transitory memory), and/or that includes machine-level instructions stored in, e.g., firmware or non-volatile memory. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Accordingly, embodiments of the present disclosure may be implemented in a wide variety of computing architectures and environments, as would be understood by one of ordinary skill in the art. One or more logical operations of embodiments of the present disclosure may be implemented as: (1) a sequence of computer implemented steps, operations, or procedures running on one or more general use programmable circuits, (2) a sequence of computer implemented steps, operations, or procedures running on one or more specific-use programmable circuits; and/or (3) interconnected machine modules or program engines within one or more general use and/or specific-use programmable circuits. One or more processors used to perform one or more steps and/or operations in accordance with embodiments of the present disclosure may also perform other functions, steps, and operations neither considered nor discussed herein (e.g., the one or more processors being multi-functional and/or capable of multi-tasking).

Depending on the embodiment of the present disclosure, some or all of the steps and/or operations may be implemented or otherwise performed, at least in part, on a portable device. "Portable device" and/or "mobile device" as used herein refers to any portable or movable electronic device having the capability of receiving wireless signals, including, but not limited to, multimedia players, communication devices, computing devices, navigating devices, etc. Thus, mobile devices include (but are not limited to) user equipment (UE), laptops, tablet computers, portable digital assistants (PDAs), mp3 players, handheld PCs, instant messaging devices (IMD), cellular telephones, global navigational satellite system (GNSS) receivers, watches, or any such device which can be worn and/or carried on one's person.

While several embodiments have been described, it will be understood that various modifications can be made without departing from the scope of the present disclosure. Thus, it will be apparent to those of ordinary skill in the art that the present disclosure is not limited to any of the embodiments described herein, but rather has a coverage defined only by the appended claims and their equivalents.

What is claimed is:

1. A method, comprising:
   determining first correlations for a first type of satellite signal over a first period;
   determining second correlations for a second type of satellite signal over a second period;
   summing the second correlations from one or more second periods until the first period is substantially the same as the second period;
   modifying first and second periods of the first correlations and modifying the second correlations in order to combine the modified first correlations and the modified second correlations;
   generating a combined satellite signal by combining the modified first correlations and the modified summed second correlations; and
   using the combined satellite signal to adjust reception of at least one of the first type of satellite signal and the second type of satellite signal.

2. The method of claim 1, wherein adjusting the reception of at least one of the first type of satellite signal and the second type of satellite signal comprises adjusting one or more parameters of at least one of tracking; acquisition; position, navigation, and/or timing (PNT) estimation, calculation, and/or correction; satellite/measurement selection or rejection; carrier frequency tracking/correlation; code frequency tracking/correlation; fault detection; fault correction; and multipath and/or non-line-of-sight (NLOS) signal mitigation.

3. The method of claim 1, wherein, when the first period is twice the length of the second period, summing the second correlations from one or more second periods until the first period is substantially the same as the second period comprises:
   adding two consecutively stored second type of satellite signals, each having the second period, to form a second type of satellite signal having the first period.

4. The method of claim 1, wherein the first type of satellite signal is a global positioning system (GPS) L1 C/A signal and the second type of satellite signal is a GPS L1C signal.

5. The method of claim 1, wherein modifying the first correlations and the second correlations comprises at least one of:
   flipping the first correlations with an opposite polarity to a common polarity; and
   flipping the summed second correlations with the opposite polarity to the common polarity.

6. The method of claim 5, wherein generating a combined satellite signal by combining the modified first correlations and the modified summed second correlations comprises:
   generating a combined satellite signal by combining the first correlations with the common polarity and the summed second correlations with the common polarity.

7. The method of claim 1, wherein the first type of satellite signal is a global positioning system (GPS) L1 C/A signal and the second type of satellite signal is a GPS L1C signal.

8. The method of claim 1, wherein modifying one or more of the first correlations and the summed second correlations in order to combine them comprises:
   applying one or more gain/balancing factors to normalize the peak amplitudes of the first correlations and the summed second correlations.

9. The method of claim 8, wherein at least one of the one or more gain/balancing factors is used to mitigate known imbalances of the transmitted powers of the first type of satellite signal and the second type of satellite signal.

10. The method of claim 8, wherein at least one of the one or more gain/balancing factors is used to mitigate detected imbalances of the received powers of the first type of satellite signal and the second type of satellite signal.

11. The method of claim 1, wherein the modified first correlations and the modified second correlations are coherently or non-coherently combined.

12. An apparatus, comprising:
    one or more non-transitory computer-readable media; and
    at least one processor which, when executing instructions stored on the one or more non-transitory computer readable media, performs the steps of:
       determining first correlations for a first type of satellite signal over a first period;
       determining second correlations for a second type of satellite signal over a second period;
       summing the second correlations from one or more second periods until the first period is substantially the same as the second period;
       modifying first and second periods of the first correlations and modifying the second correlations in order to combine the modified first correlations and the modified second correlations;
       generating a combined satellite signal by combining the modified first correlations and the modified summed second correlations; and
       using the combined satellite signal to adjust reception of at least one of the first type of satellite signal and the second type of satellite signal.

13. The apparatus of claim 12, wherein adjusting the reception of at least one of the first type of satellite signal and the second type of satellite signal comprises adjusting one or more parameters of at least one of tracking; acquisition; position, navigation, and/or timing (PNT) estimation, calculation, and/or correction; satellite/measurement selection or rejection; carrier frequency tracking/correlation; code frequency tracking/correlation; fault detection; fault correction; and multipath and/or non-line-of-sight (NLOS) signal mitigation.

14. The apparatus of claim 12, wherein, when the first period is twice the length of the second period, summing the second correlations from one or more second periods until the first period is substantially the same as the second period comprises:
    adding two consecutively stored second type of satellite signals, each having the second period, to form a second type of satellite signal having the first period.

15. The apparatus of claim 14, wherein the first type of satellite signal is a global positioning system (GPS) L1 C/A signal and the second type of satellite signal is a GPS L1C signal.

16. The apparatus of claim 12, wherein modifying the first correlations and the second correlations comprises at least one of:
    flipping the first correlations with an opposite polarity to a common polarity; and flipping the summed second correlations with the opposite polarity to the common polarity.

17. The apparatus of claim 16, wherein generating a combined satellite signal by combining the modified first correlations and the modified summed second correlations comprises:
generating a combined satellite signal by combining the first correlations with the common polarity and the summed second correlations with the common polarity.

18. The apparatus of claim 12, wherein modifying one or more of the first correlations and the summed second correlations in order to combine them comprises:
applying one or more gain/balancing factors to normalize the peak amplitudes of the first correlations and the summed second correlations.

19. The apparatus of claim 18, wherein at least one of the one or more gain/balancing factors is used to mitigate known imbalances of the transmitted powers of the first type of satellite signal and the second type of satellite signal.

20. The apparatus of claim 18, wherein at least one of the one or more gain/balancing factors is used to mitigate detected imbalances of the received powers of the first type of satellite signal and the second type of satellite signal.

* * * * *